United States Patent [19]
Yasui et al.

[11] Patent Number: 5,892,789
[45] Date of Patent: Apr. 6, 1999

[54] SOLID-STATE LASER APPARATUS

[75] Inventors: Koji Yasui; Takafumi Kawai; Tetsuo Kojima; Susumu Konno, all of Tokyo, Japan

[73] Assignee: Mitsubishi Denki Kabushiki Kaisha, Tokyo, Japan

[21] Appl. No.: 899,889

[22] Filed: Jul. 24, 1997

Related U.S. Application Data

[63] Continuation of Ser. No. 579,969, Dec. 28, 1995, abandoned.

[30] Foreign Application Priority Data

Jan. 10, 1995 [JP] Japan .................................. 7-001907
Dec. 18, 1995 [JP] Japan .................................. 7-329306

[51] Int. Cl.$^6$ .................................................. H01S 3/14
[52] U.S. Cl. .............................. 372/68; 372/69; 372/97; 372/92; 372/22; 372/72; 372/34; 372/105
[58] Field of Search .................. 372/34, 69, 97, 372/22, 36, 70, 92, 72, 102, 105, 68

[56] References Cited

U.S. PATENT DOCUMENTS

| | | | |
|---|---|---|---|
| 3,484,714 | 12/1969 | Koester et al. | 372/34 |
| 4,096,450 | 6/1978 | Hill et al. | 372/72 |
| 4,910,746 | 3/1990 | Nicholson | 372/72 |
| 4,912,720 | 3/1990 | Springsteen | 372/72 |
| 4,993,038 | 2/1991 | Nakano et al. | 372/72 |
| 5,206,867 | 4/1993 | Esterowitz | 372/105 |
| 5,234,611 | 8/1993 | Hyuga et al. | 372/34 |
| 5,243,611 | 9/1993 | Hyuga et al. | 372/22 |
| 5,263,042 | 11/1993 | Kojima et al. | 372/72 |
| 5,272,713 | 12/1993 | Sobey et al. | 372/69 |
| 5,325,378 | 6/1994 | Zorabedian | 372/102 |
| 5,381,427 | 1/1995 | Wedekind et al. | 372/105 |
| 5,446,750 | 8/1995 | Ohtsuka et al. | 372/34 |
| 5,497,387 | 3/1996 | Okazaki | 372/105 |
| 5,590,148 | 12/1996 | Szarmes | 372/105 |

FOREIGN PATENT DOCUMENTS

| | | |
|---|---|---|
| 2220173 | 11/1973 | Germany. |
| 2949906 | 7/1980 | Germany. |
| 3726279 | 2/1989 | Germany. |

OTHER PUBLICATIONS

Birefringence Compensation and $TEM_{oo}$ Mode Enhancement in a Nd: YAG Laser, W.C. Scott and M. de Wit, Applied Physics Letters, vol. 18, No. 1, (Jan. 1, 1971).

Applied Physics Letters, vol. 18, No. 1, Jan. 1, 1971, Birefringence Compensation and TEM Mode Enhancement in a Nd: YAG Laser, by W.C. Scott and M. De Wit.

Journal of Applied Physics, 26 (1993) 1884–1891, Thermal lensing and depolarization in a highly pumped Nd:YAG laser amplifier, by Hans J. Eichler, Andreas Haase, Ralf Menzel and Andreas Siemoneit.

IEEE Journal of Quantum Electronics, vol. 24, No. 4 Apr. 1988, Multirod Resonators for High–Power Solid–State Lasers with Improved Beam Quality, by K.P. Driedger, R.M. Ifflander and H. Weber.

Solid–State Laser Engineering, Springer Series in Optical Sciences, by Walter Koechner, 1988.

*Primary Examiner*—Leon Scott, Jr.
*Attorney, Agent, or Firm*—Sughrue, Mion, Zinn, Macpeak & Seas, PLLC

[57] ABSTRACT

A solid-state laser apparatus comprises a plurality of solid-state materials each having an active solid-state medium and arranged in a row with a predetermined space on an optical axis of light incident thereon. An optical rotation material and an angle adjusting instrument for adjusting an angle between the optical rotation material and the optical axis of incident light are disposed in at least a space selected from among the plural spaces. The laser apparatus further comprises a laser optical system for extracting a laser beam emitted by the plural solid-state materials.

19 Claims, 36 Drawing Sheets

PUMPING LIGHT SOURCE POWER

BEAM DIAMETER IN SOLID-STATE MATERIAL

PUMPING LIGHT SOURCE POWER

BEAM DIAMETER IN SOLID-STATE MATERIAL

F I G. 1 5
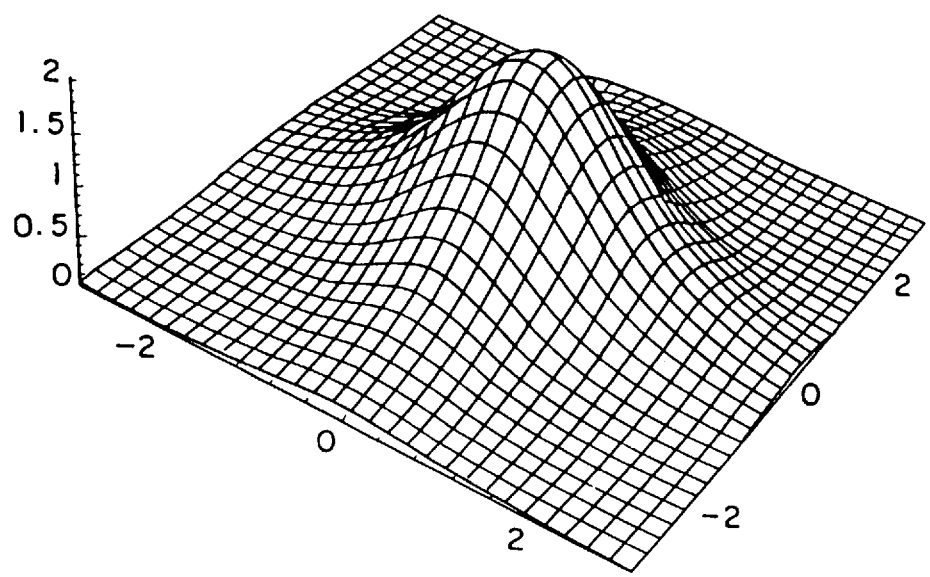

SOLID-STATE LASER APPARATUS

This is a Continuation of application Ser. No. 08/579,969 filed Dec. 28, 1995 now abandoned.

BACKGROUND OF THE INVENTION

1. Field of the Invention

The present invention relates to a solid-state laser apparatus comprising a plurality of solid-state materials each including an active solid-state medium.

2. Description of the Prior Art

Referring now to FIG. 37, it illustrates a side view of a prior art solid-state laser apparatus as disclosed in technical literature such as Solid-State Laser Engineering, Springer-Verlag, pages 119–120. In the figure, reference numeral 1 denotes a reflection mirror, 2 denotes a partial reflection mirror, and 3 denotes a solid-state material including an active solid-state medium. In the case of a YAG laser, Nd:YAG (Nd:Yttrium Aluminum Garnet) is a solid-state material doped with Nd as an active solid-state material. Furthermore, reference numeral 4 denotes a pumping light source such as a semiconductor laser including GaAlAs as a major constituent thereof, 5 denotes a power supply which drives the pumping light source 4, 6 denotes a focus lens, 7 denotes a laser beam generated in a laser cavity constructed by the mirrors 1 and 2, 10 denotes an optical coating on the mirror 1 which serves to totally reflect the laser beam 7 and totally transmit incident light from the semiconductor laser 4, 70 denotes a laser beam which is extracted out of the laser cavity by the partial reflection mirror 2, and 100 denotes a base.

Next, the description will be directed to the operation of the prior art laser apparatus. When the power supply 5 by the light source is introduced into an end of the solid-state material 3 by the focus lens 6. Then, the pumping light which enters into the solid-state material 3 excites the active solid-state medium to produce a laser amplifying medium. Spontaneous emission light emitted by the laser amplifying medium travels back and forth within the laser cavity constructed by the mirrors 1 and 2 and is amplified during the travel. Furthermore, the directivity of the laser beam 7 is increased during the travel. When the power of the laser beam reaches a certain value, the laser beam is extracted out of the laser cavity as the laser beam 70.

Thus, such a prior art solid-state laser apparatus having the above-mentioned structure suffers from a problem that it cannot generate a high-power and high-quality laser beam when it is pumped by a high-power pumping light source. It is presumed that birefringence generated within the solid-state material due to thermal deformations causes a reduction in laser beam quality. However, the detailed mechanism to cause such a reduction has been unknown.

SUMMARY OF THE INVENTION

The purpose of the present invention is to overcome the disadvantage. More precisely, an object of the present invention is to provide a solid-state laser apparatus which is able to generate a high-power and high-quality laser beam stably.

In accordance with one aspect of the present invention, there is provided a solid-state laser apparatus comprising a plurality of solid-state materials arranged separately on an optical axis of light incident thereon, the plural solid-state materials each having an active solid-state medium; a pumping mechanism for pumping the plural solid-state materials; a mechanism disposed between two of the plural solid-state materials for rotating the direction of polarization of a laser beam incident thereon; and a laser optical mechanism for extracting the laser beam emitted by the plural solid-state materials. Preferably, the polarization rotating mechanism includes at least one optical rotation material for rotating the direction of polarization of the incident laser beam through a total angle of about 90° during the laser beam passes therethrough one time.

In accordance with another aspect of the present invention, there is provided a solid-state laser apparatus comprising a plurality of pumping modules each including a plurality of solid-state materials arranged separately on an optical axis of light incident thereon, the plural solid-state materials each having an active solid-state medium, a pumping mechanism for pumping the plural solid-state materials, and a mechanism disposed between two of the plural solid-state materials for rotating the direction of polarization of a laser beam incident thereon; an optical coupling mechanism for optically coupling the plural pumping modules so that the trace of the outside shape of a laser beam which varies when it travels through the plural solid-state materials in their longitudinal directions within the one pumping module is nearly the same as that within any other pumping module; and a laser optical mechanism for extracting the laser beam emitted by the plural pumping modules.

In accordance with another aspect of the present invention, there is provided a solid-state laser apparatus comprising a plurality of solid-state materials arranged separately on an optical axis of light incident thereon, the plural solid-state materials each having an active solid-state medium; a pumping mechanism for pumping the plural solid-state materials; an optical axis correcting mechanism disposed between two of the plural solid-state materials for correcting the position of the optical axis of the laser beam incident thereon; and a laser optical mechanism for extracting the laser beam emitted by the plural solid-state materials.

In accordance with another aspect of the present invention, there is provided a solid-state laser apparatus comprising: a plurality of solid-state materials arranged separately on an optical axis of light incident thereon, the plural solid-state materials each having an active solid-state medium; a pumping mechanism for pumping the plural solid-state materials; a moving mechanism for moving an end part of at least the one solid-state material vertically and horizontally; and a laser optical mechanism for extracting the laser beam emitted by the plural solid-state materials.

In accordance with another aspect of the present invention, there is provided a solid-state laser apparatus comprising a plurality of solid-state materials arranged separately on an optical axis of light incident thereon, the plural solid-state materials each having an active solid-state medium; a pumping mechanism for pumping the plural solid-state materials; a wavelength converting mechanism for converting the wavelength of the laser beam emitted by the plural solid-state materials; a temperature controlling mechanism for controlling the temperature of the wavelength converting mechanism so that a distribution of thermal deformations in cross section of the wavelength converting mechanism is geometrically similar to a distribution of thermal deformations in cross section of any one of the solid-state materials; and a laser optical mechanism for extracting the laser beam emitted by the plural solid-state materials.

Further objects and advantages of the present invention will be apparent from the following description of the preferred embodiments of the invention as illustrated in the accompanying drawings.

BRIEF DESCRIPTION OF THE DRAWINGS

FIG. 15 is a view showing thermal deformations generated within a wavelength converting material in the solid-state laser apparatus according to the embodiment shown in FIG. 12;

DETAILED DESCRIPTION OF THE PREFERRED EMBODIMENTS

Figure 1:
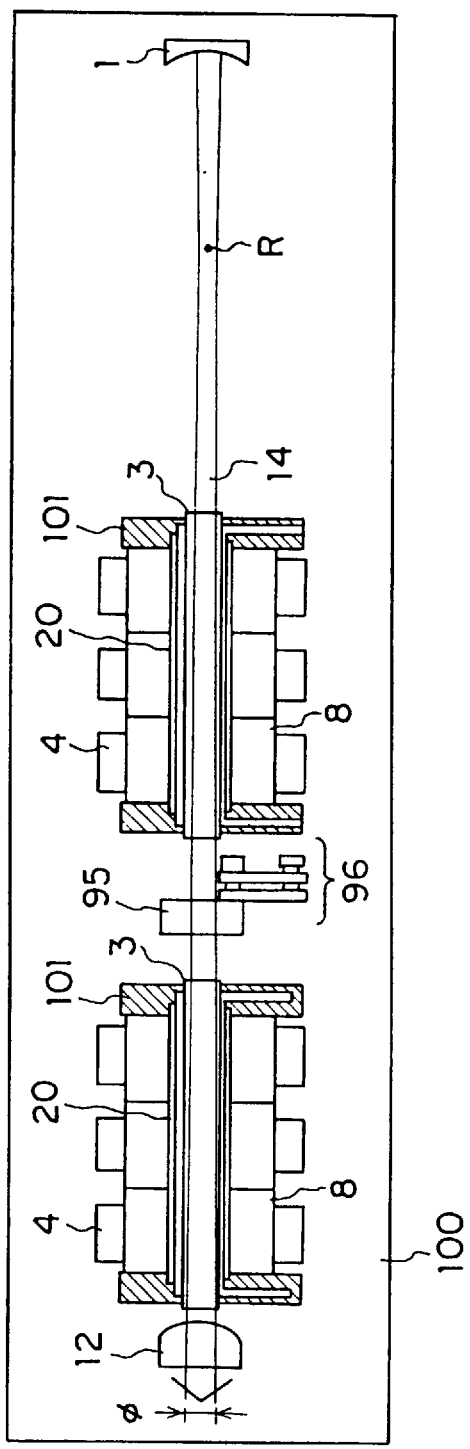
FIG. 1 is a horizontal sectional view of a solid-state laser apparatus according to an embodiment of the present invention.
Figure 2A:
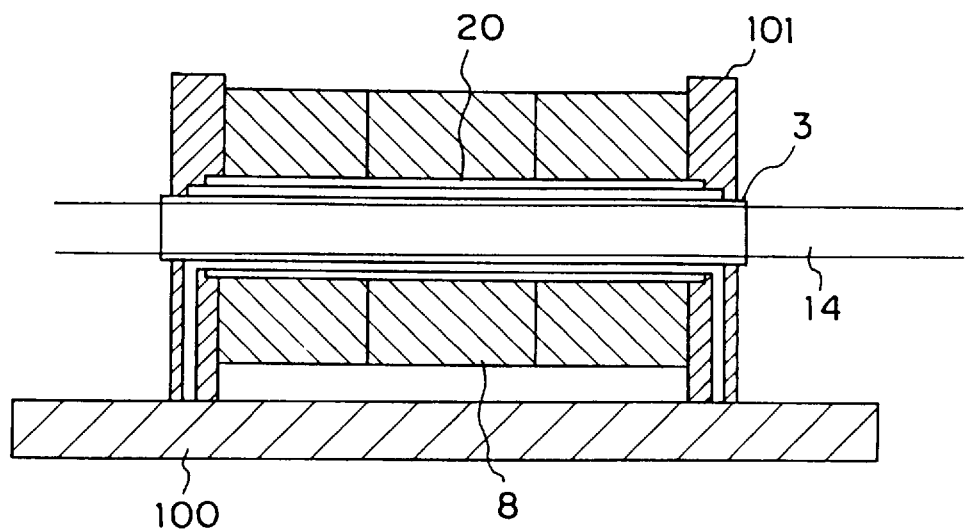
FIG. 2a is a longitudinally vertical sectional view of the solid-state laser apparatus shown in FIG. 1.
Figure 2B:
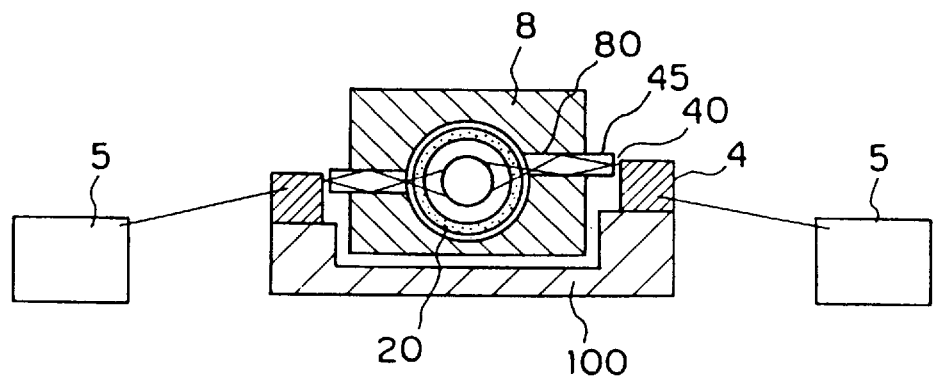
FIG. 2b is a transversely vertical sectional view of the solid-state laser apparatus shown in FIG. 1.
Figure 2C:
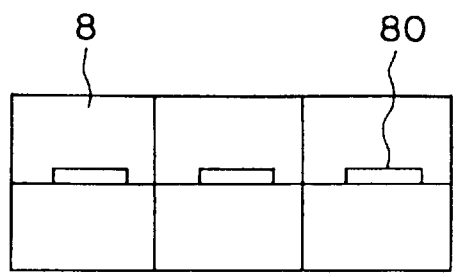
FIG. 2c is a side view of the solid-state laser apparatus shown in FIG. 1.

Referring now to FIG. 1, it illustrates a horizontal sectional view of a solid-state laser apparatus according to one embodiment of the present invention. FIG. 2a is a longitudinally vertical sectional view showing in detail a pumping section of the solid-state laser apparatus, FIG. 2b is a transversely vertical sectional view of the pumping section, and FIG. 2c is a side view of the pumping section. In the figures, the same components as those in the prior art solid-state laser mentioned above or like components are designated by the same reference numerals as those shown in FIG. 37. Reference numeral 8 denotes a condenser having a diffuse reflection inner surface, 12 denotes a partial reflection mirror, 14 denotes a fundamental wave laser beam emitted by a plurality of solid-state materials 3, and 20 denotes a flow tube. In one section including one solid-state material 3, cooling water flows between a corresponding flow tube 20 and the solid-state material 3. Furthermore, the condenser 8 is supported so that it encloses the flow tube 20 therein. In FIG. 2b, reference numeral 45 denotes an optical waveguide material in the shape of a plate, which is constructed of a material such as sapphire or YAG doped with no material. The optical waveguide material serves to guide pumping light emitted by a pumping light source 4 to the interior of the condenser 8. Furthermore, reference numeral 80 denotes an opening penetrating a side wall of the condenser 8, 95 denotes an optical rotation material constructed of for example crystal for rotating the direction of polarization of the laser beam 14, which is emitted by the plural solid-state materials 3 and is traveling therethrough, by an angle of about 90°, 96 denotes an angle adjusting instrument for adjusting the angle which the optical rotation material 95 forms with the incident laser beam 14, and 100 denotes a base constructed from a plate made of stainless steel or acrylic. The solid-state materials 3, pumping light sources 4, condensers 8, optical rotation material 95, reflection mirror 1, and partial reflection mirror 12 are integrally disposed on the base 100. Furthermore, reference numeral 101 denotes a side plate, $\phi$ denotes the diameter of the solid-state materials 3, and R denotes a beam waist of the laser beam 14.

Next, the description will be directed to the operation of the solid-state laser apparatus of this embodiment. The operation of one pumping section in the solid-state laser apparatus having the above-mentioned structure will be explained by referring to FIG. 2b. As can be seen from FIG. 2b, when the power supply 5 switches on the pumping light source 4, pumping light 40 emitted by the light source travels while it is being totally and repeatedly reflected off the upper and lower surfaces of the optical waveguide material 45 inserted into one opening 80 in a side wall of the condenser 80. Then, the pumping light enters into the interior of the condenser 8 and optically pumps the solid-state material 3 within the condenser to produce a laser amplifying medium for amplifying the laser beam 14.

The remainder of the pumping light 40 which is not absorbed into the solid-state material 3 passes through the solid-state material 3, and after that it is diffusely reflected off the inner surface of the condenser 8. Then, the remainder of the pumping light enters into the solid-state material 3 from the surrounding again and pumps the solid-state material 3 uniformly. Thus, since light emitted by the pumping light source 4 travels repeatedly within the interior of the condenser 8 and most of the light is absorbed into the solid-state material 3 without wastage of the pumping light, an uniform laser amplifying medium can be produced efficiently within the solid-state material. As shown in FIG. 2b, the two optical waveguide materials 45 each of which guide the pumping light 40 are arranged on both sides of the solid-state material 3. The vertical positions of the waveguide materials are different from each other. They are arranged opposite to each other so that the pumping light rays enter into parts of the solid-state material which are away from the axis of the solid-state material. Therefore, this arrangement can prevent the interference between the light rays emitted by the left-side and right-side pumping sources 4 and the uniformity of the pumping distribution in the solid-state material 3 can be improved.

In this embodiment, the aforementioned two pumping sections as shown in FIGS. 2a each having one solid-state material 3 are arranged in a row with a predetermined space and the optical rotation material 95 provided with the angle adjusting instrument 96 capable of providing a fine angle adjustment is located between the pumping sections, as shown in FIG. 1. The laser cavity constructed by a combination of the reflection mirror 1 and partial reflection mirror 12 extracts the laser beam 14 from the two pumping sections.

Figure 3:
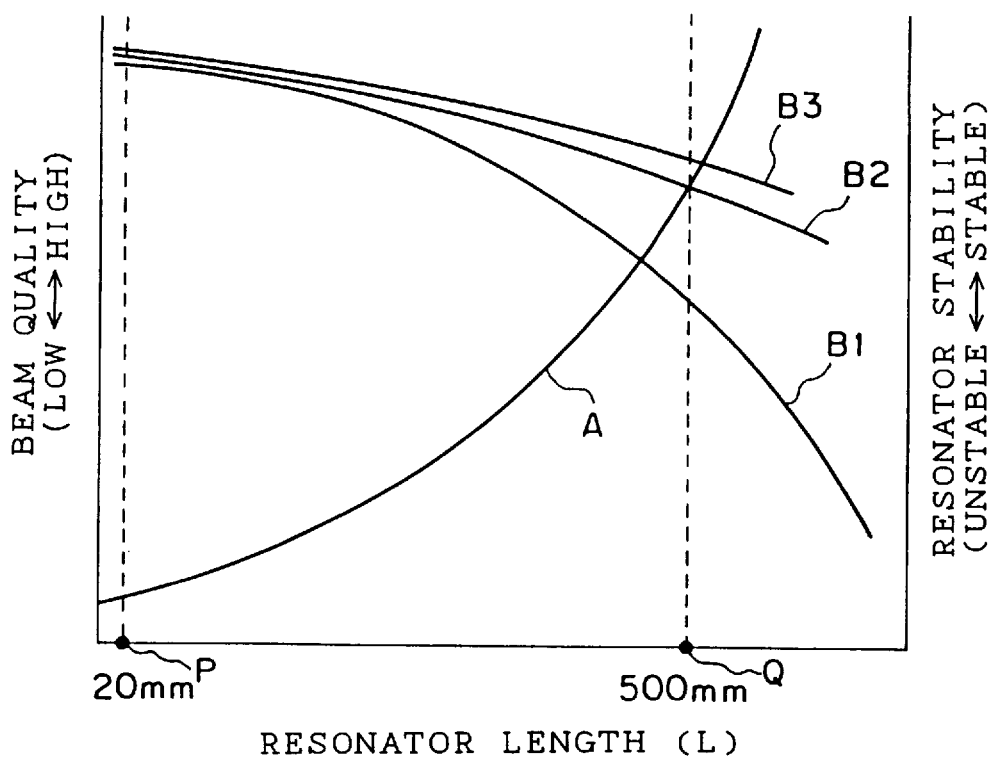
FIG. 3 is a plot showing the quality of a laser beam and strength of a laser cavity with respect to the length of the laser cavity in the solid-state laser apparatus shown in FIG. 1.

A relationship between the length L of the laser cavity, or the distance (the vertical axis) between the reflection mirror 1 and the partial reflection mirror 12 and the laser beam quality (the horizontal axis) is shown by a curved line A in FIG. 3. This characteristic shows that the quality of a laser beam emitted by one solid-state material 3 is improved as the length of the laser cavity is increased. On the other hand, the power of a laser beam emitted by one solid-state material 3 is associated with the strength (stability) of the laser cavity with respect to the distortion of the solid-state material 3. As the length of the laser cavity is increased, the strength of the laser cavity with respect to the distortion of the solid-state material 3 is reduced and hence the laser power cannot be improved. A curved line B1 shown in FIG. 3 shows a relationship between the length of the laser cavity and the strength of the laser cavity when the distortion of the solid-state material 3 is relatively big, and a curved line B2 shows a relationship between the length of the laser cavity and the strength of the laser cavity when the distortion of the solid-state material 3 is relatively small.

Next, a solid-state laser structure in which two pumping sections are arranged in a row with a predetermined space and no optical rotation material is disposed between the pumping sections will be considered for comparison with the present invention. That is, a solid-state laser apparatus in which the optical rotation material 95 and angle adjusting instrument 96 are omitted from the configuration shown in FIG. 1 will be explained as an example for comparison with the present invention.

When the reflection mirrors 1 and 2 are located in the vicinity of the solid-state material 3 and the length of the laser cavity is about 20 mm, like a prior art solid-state laser mentioned above (see FIG. 37), the configuration is indicated by the point P shown in FIG. 3. As can be seen from the curved lines B1 and B2, the strength of the laser cavity is not highly dependent on the distortion of the solid-state material 3 in the case of the configuration indicated by the point P. In this case, a sufficient laser power can be obtained. However, in the configuration, the quality of the laser beam (e.g. the beam divergence of the laser beam) emitted by the solid-state laser is bad as can be seen from the curved line A. It is known that the quality of the laser beam is increased with a decrease in the ratio $\phi/2\omega$, where $\phi$ is the diameter of the solid-state material 3 and $\omega$ is the largest value of the laser beam radius which varies when the laser beam travels within the solid-state material 3, the laser beam radius being defined by the distance between the central point of the laser beam in cross section and a point at which the theoretically calculated strength of a Gaussian laser beam in the solid-state material 3 is decreased to $1/e^2$ (e: the base of the natural logarithm) of the strength at the central point. In the above-mentioned configuration with bad laser beam quality, the theoretically calculated diameter of the Gaussian laser beam in the solid-state material 3 is approximately 1/14 of the diameter of the solid-state material 3 and the quality of the laser beam 14 is about 1/200 of the quality of the Gaussian laser beam which is the theoretical limit. That is, the laser beam 14 at about 200th order transverse mode can be obtained.

On the contrary, in the example for comparison with the present invention, the length of the laser cavity is set to be about 500 mm, as shown in FIG. 1. For example, using the reflection mirror 1 with a small curvature, for example smaller than 1 m, typically in the range of from 0.5 m to 0.1 m, a focused small spot of the laser beam is produced in the front of the reflection mirror 1. A combination of the convex partial reflection mirror 12 which is located in the vicinity of one solid state material 3 and the thermal convex lens effect of the solid-state materials 3 serves as a reflection mirror with a big curvature of substantially several meters. The configuration of the unbalanced laser cavity, the length of which is about 500 mm, is indicated by the point Q shown in FIG. 3. Therefore, the quality of the laser beam can be improved as can be seen from the curved line A.

Figure 4:
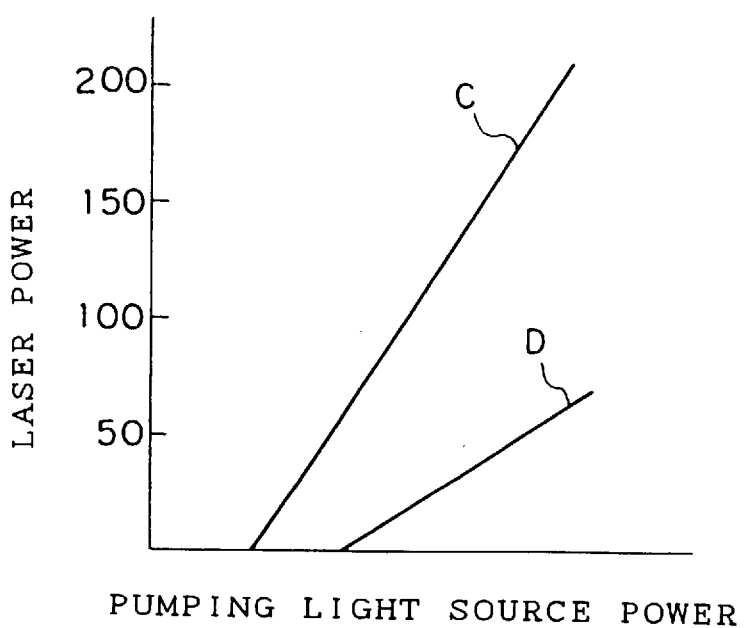
FIG. 4 is a plot showing the power of a laser beam with respect to the power of a pumping light source in the solid-state laser apparatus shown in FIG. 1.

The laser cavity of the example is so constructed that the diameter of the laser beam 14 within one solid-state material 3 is greater than that of the laser beam at the beam waist point R and therefore the theoretically calculated diameter of a Gaussian laser beam in the vicinity of each of the solid-state materials 3 is increased. An experiment was carried out on condition that the theoretically calculated diameter of a Gaussian laser beam in the vicinity of each of the solid-state materials 3 is about 1/5 of the diameter of the solid-state material 3. In this case, the laser beam quality was about 1/20 of the diffraction limit and the transverse mode order of the laser beam was about 20th order. That is, the quality of the laser beam was considerably reduced to about 1/10 of that of the laser beam in the case of the prior art solid-state laser mentioned above. However, the oscillation efficiency of the laser apparatus was reduced and fluctuations of the laser power were observed. FIG. 4 shows an example of oscillation characteristics obtained by experiment. The vertical axis of the graph shows the power of the pumping light source 4 and the horizontal axis shows the laser power. In the figure, the line C represents the oscillation characteristics of the aforementioned prior art solid-state laser which generates a laser beam with a bad beam quality which is about 1/200 of a Gaussian laser beam with the theoretical limit, i.e., with a beam quality of 200th transverse mode order. The line D represents the oscillation characteristics of the above-mentioned example which generates a laser beam with a bad beam quality which is about 1/20 of a Gaussian laser beam with the theoretical limit, i.e., with a beam quality of about 20th transverse mode order. In accordance with the example having the oscillation characteristics shown by the line D, the laser beam quality is improved. However, there is a problem that the laser power is reduced.

In this embodiment, the optical rotation material 95 is inserted between the solid-state materials 3. Furthermore, the angle which the optical rotation material forms with the optical axis of the incident laser beam can be finely adjusted in increments of several milliradians by means of the angle adjusting instrument 96. When the angle adjustment is carried out optimally, the strength of the laser cavity becomes greater than that of the laser cavity in the example (see the curved line B2) as can be seen from the curved line B3 shown in FIG. 3. Thus, the solid-state laser apparatus of this embodiment can provide laser beam quality similar to that of the aforementioned example and oscillation characteristics as shown by the line C in FIG. 4. Furthermore, the solid-state laser apparatus of this embodiment can generate an oscillation wave with little fluctuations.

Table 1 shows laser powers, which vary with increase in the laser beam transverse mode order, when the optical rotation material 95 is inserted between the two solid-state materials 3 like this embodiment and when there is no optical rotation material 95 between the two solid-state materials 3 like the example mentioned above for comparison with the present invention. In the case of a prior art laser without the optical rotation material 95, a laser power of 200 W is obtained for the laser beam at 200th order transverse mode, as shown in Table 1. In the case of the above-mentioned example without the optical rotation material 95, a laser power of 50 W is obtained for the laser beam at 20th order transverse mode. As previously mentioned, the laser quality of the laser apparatus of the example is improved; however, the laser power is reduced. On the other hand, in the case of this embodiment with the optical rotation material 95, a laser power of 200 W is obtained for the laser beam at 20th order transverse mode. Thus, the laser power of the solid-state laser apparatus according to this embodiment can be improved.

TABLE 1

| transverse mode order | laser power (with optical rotation material) | laser power (without optical rotation material) |
| --- | --- | --- |
| 10 | 195 W | 10 W |
| 20 | 200 W | 50 W |
| 50 | 200 W | 90 W |
| 75 | 200 W | 120 W |
| 100 | 200 W | 150 W |
| 150 | 200 W | 190 W |
| 200 | 200 W | 200 W |

As can be seen from Table 1, it is clear from the experimental results that the optical rotation material 95 works best when the quality of the laser beam 14 is about 1/100 of the theoretical limit, that is, the transverse mode order of the laser beam is less than about 100th order. When a stable laser cavity is used like this embodiment, the above-mentioned condition can be achieved by arranging the stable laser cavity so that $\phi/(2\omega)$ is less than about 10. When an unstable laser cavity is used, there is no need to satisfy the inequality ($\phi/(2\omega)$ < about 10) in order to produce a laser beam the transverse mode order of which is less than about 100th order.

Next, the effect of the optical rotation material 95 according to this embodiment will be considered theoretically. When each of the solid-state materials 3 is pumped by pumping light travels from its surroundings, it is thermally deformed. For example, in the case of a solid-state material of circular cross section, there exist differences between the expansion of the crystal in the radial direction in cross section and the expansion of the crystal in the angular direction in cross section, and difference between variations in the refractive index of the crystal in the radial direction in cross section and variations in the refractive index of the crystal in the angular direction in cross section. The expansion in the radial direction is perpendicular to the expansion in the angular direction, and therefore the solid-state material serves as two different thermal lenses according to the different expansion directions. The focal distances of the thermal lenses are different for different polarized components of the incident laser beam 14.

Figure 5A:
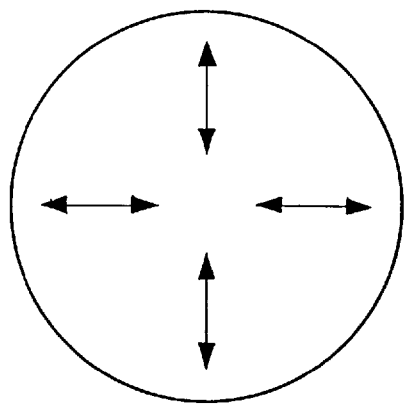
FIG. 5a and 5b are views showing fundamental polarization modes of laser beams generated in the solid-state laser apparatus shown in FIG. 1.
Figure 5B:
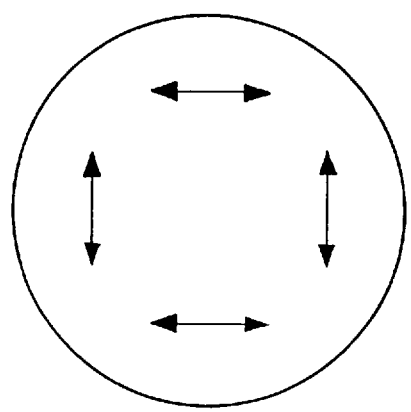
Figure 6A:
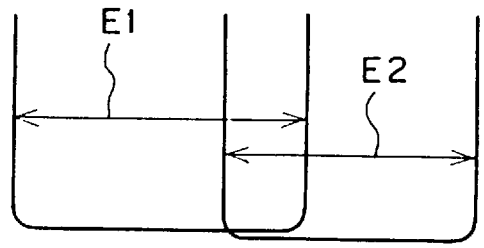
FIG. 6a is a plot showing the diameter of a laser beam travelling through one solid-state material with respect to the power of a pumping light source in a prior art solid-state laser apparatus.

For example, when the laser beam 14 at two fundamental polarization modes as indicated by arrows in FIGS. 5a and 5b passes through the solid-state material 3, the magnitude of the thermal lens effect on one laser beam component at one fundamental polarization mode is different from that of the thermal lens effect on the other laser beam component at the other fundamental polarization mode. In the case of a solid-state laser without an optical rotation material 95, when plotting the theoretically calculated diameter of a Gaussian laser beam in one solid-state material 3 with respect to the power of the pumping light source 4, the diameter-power characteristics for the fundamental polarization mode as shown in FIG. 5a is represented by a region E1, and the diameter-power characteristics for the fundamental polarization mode as shown in FIG. 5b is represented by a region E2, as shown in FIG. 6a. Therefore, when the pumping power is within these regions E1 and E2 which are obtained by calculation, the solid-state material can oscillate at either of the two fundamental polarization modes. If the pumping power is not within either of the regions E1 and E2, a loss in the laser cavity is too big for the solid-state material to oscillate. When the pumping power is within the overlapped part of the regions E1 and E2, laser beam components at the two fundamental polarization modes can be generated simultaneously. In this case, the solid-state laser can produce a laser beam 14 having a beam component polarized in an arbitrary direction. However, when the pumping power is within either of the regions E1 and E2 except the overlapped part, only a laser beam 14 at either of the two fundamental polarization modes shown in FIGS. 5a and 5b can be generated.

Next, the description will be directed to a loss generation mechanism in either of the regions E1 and E2 except the overlapped part. In order to generate a laser beam at the fundamental polarization mode shown in FIG. 5a, the directions of thermal deformations in cross section of one solid-state material 3 must be symmetric with respect to the central axis of the solid-state material, that is, the distribution of the directions of thermal deformations in cross section of one solid-state material 3 must be uniform. However, actually, there may be a case where the directions of thermal deformations in cross section of such a crystal are not symmetric with respect to the central axis of the crystal. In such a case, generated light at the polarization mode shown in FIG. 5a is partially converted into light at the other fundamental polarization mode shown in FIG. 5b due to the thermal deformations within the solid-state material 3. The solid-state laser apparatus can oscillate at the converted fundamental polarization mode, if the pumping power is in the range of the region E2 shown in FIG. 6a. However, since the pumping power is in the range of the region E1, the converted light is discharged out of the laser cavity as a loss. Due to thermal deformations in each of the solid-state materials 3, the diameter of the laser beam in the solid-state material 3 varies within the regions E1 and E2 in FIG. 6a according to the power of the pumping light source 4. Thus, the overlapped part in the regions is narrower than the other parts of the regions and this results in a big loss in the laser cavity.

In the theoretical calculation, the smaller the ratio $\phi/2\omega$, where $\phi$ is the diameter of the solid-state material 3 and $\omega$ is the theoretically calculated diameter of a Gaussian laser beam, the narrower the overlapped part in the regions becomes. This is a leading cause of an inadequate laser power when improving the laser beam quality of the laser beam emitted by the solid-state materials 3 in the aforementioned example. Furthermore, as a position illuminated by pumping light from the pumping light source 4 fluctuates, the overlapped part in the regions fluctuates. Then, the fluctuation of the distribution of pumping in cross section of one solid-state material causes a part of the material in cross section to oscillate in an operating condition within the overlapped part in the regions E1 and E2 in FIG. 6a without losses. The part which oscillates moves within the solid-state material as the distribution of pumping varies. As a result, the laser power fluctuates.

Figure 6B:
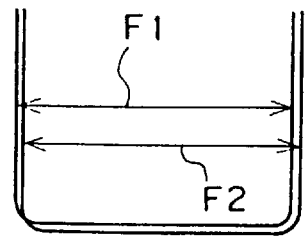
FIG. 6b is a plot showing the diameter of a laser beam travelling through one solid-state material with respect to the power of a pumping light source in the solid-state laser apparatus shown in FIG. 1.

On the other hand, in the present embodiment, the laser cavity having the optical rotation material 95 inserted between the plural pumping sections rotates the direction of polarization of an incident laser beam, which has passed through the first solid-state material 3, through an angle of about 90°. That is, a laser beam component at the fundamental polarization mode shown in FIG. 5a, which is incident on the first solid-state material 3, is converted into a laser beam component at the fundamental polarization mode shown in FIG. 5b and then the converted beam component enters into and passes through the second solid-state material 3, and a laser beam component at the fundamental polarization mode shown in FIG. 5b, which is incident on the first solid-state material 3, is converted into a laser beam component at the fundamental polarization mode shown in FIG. 5a and then the converted beam component enters into and passes through the second solid-state material 3. Thus, a laser beam component having either of the polarization characteristics shown in FIGS. 5a and 5b passes through the two solid-state materials 3 between which the optical rotation material 95 is disposed in such a manner that the direction of polarization of the component when passing through the first solid-state material is different from that of the component when passing through the second solid-state material. Therefore, one laser beam component undergoes different thermal lens effects according to the directions of polarization of the laser beam component when passing through the two solid-state materials 3. The lens effect of one solid-state material 3 differs according to the directions of polarization of the laser beam 14 as shown in FIGS. 5a and 5b, however, two laser beam components polarized in the different directions and included in the laser beam 14 undergo different thermal lens effects respectively when passing through the two solid-state materials 3 and therefore the two laser beam components undergo the same thermal lens effect during they pass through the whole laser apparatus. In this case, when plotting the theoretically calculated diameter of a Gaussian laser beam in one solid-state material 3 with respect to the power of the pumping light source 4 with the same method as that used for calculating the regions shown in FIG. 6a, the diameter-power characteristics for the laser beam 14 at the fundamental polarization mode as shown in FIG. 5a is represented by a region F1 in FIG. 6b, and the diameter-power characteristics for the laser beam 14 at the fundamental polarization mode as shown in FIG. 5b is represented by a region F2 in FIG. 6b. As shown in FIG. 6b, the two regions F1 and F2 for the laser beam 14 at the fundamental polarization modes are overlapped and the overlapped part is considerably wider than that in the case of FIG. 6a. As a result, the solid-state laser apparatus can oscillate at both of the two fundamental polarization modes in an extended operating condition range within the overlapped part in the regions F1 and F2. Therefore, it is clear that even if the direction of polarization of a laser beam component is varied (e.g. a linearly polarized beam is converted into an elliptically polarized beam due to birefringence), the laser beam is not discharged out of the laser cavity as a loss, fluctuations of the laser power can be prevented, and the laser apparatus of this embodiment can oscillate stably. Since the central portions of the patterns of the laser beams at the fundamental polarization modes shown in FIGS. 5a and 5b are shaped like a doughnut, the necessity for providing the optical rotation material 95 when a Gaussian beam with the theoretically limited beam quality is generated or when a linearly polarized laser beam is generated by inserting a polarizer into the laser cavity could be expected before the experiments have been conducted. However, it has never been shown before the experiments that such an optical rotation material 95 is effective even in a low-mode oscillating condition wherein the laser beam quality is about 100 to several times as much as the theoretically limited quality.

Next, the description will be directed to the uniformity of the pumping distribution. In the theoretical explanation, it is assumed that the thermal lens effect is uniform within each of the solid-state materials 3. This assumption is based on the fact that according to this embodiment each of the solid-state materials 3 is pumped within the corresponding condenser 3 having a diffuse reflection surface and the pumping light 40 is nearly uniformly focused onto each of the solid-state materials 3. Furthermore, according to the present embodiment, the uniformity of the thermal lens effect within one solid-state material 3 can be realized by setting the surface roughness of the solid-state material 3 to be greater than a predetermined value, e.g. 100 microns, so as to adjust the extent of the diffusive reflection of the pumping light 40 which is incident on the surface of the solid-state material 3.

Figure 7:
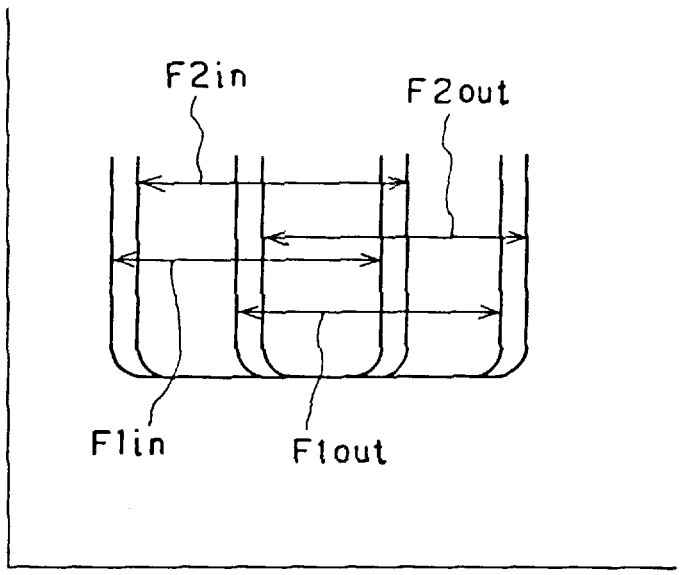
FIG. 7 is a plot showing the diameter of a laser beam travelling through one solid-state material with respect to the power of a pumping light source in a prior art solid-state laser apparatus when thermal lens effects for different polarization modes are nonuniform.

In a prior art solid-state laser apparatus such as a commercial solid-state laser, the uniformity of the pumping cannot be realized. In such a case, a thermal lens distribution is generated in cross section of the solid-state material in the laser and therefore the effect of inserting an optical rotation material is reduced. FIG. 7 shows how the ranges F1 and F2 shown in FIG. 6b change according to a non-uniform thermal lens distribution in cross section of the solid-state material. In FIG. 7, reference characters F1in and F1out respectively denote oscillating regions calculated in consideration of thermal lens effects in the central portion in cross section of the first solid-state material 3 and peripheral portion surrounding the central portion, and F2in and F2out respectively denote oscillating regions calculated in consideration of thermal lens effects in the central portion in cross section of the second solid-state material 3 and peripheral portion surrounding the central portion. When the uniformity of the pumping cannot be realized, the width of the overlapped part in the oscillating regions is reduced as compared with FIG. 6b, as shown in FIG. 7. Thus, the laser power is decreased and the oscillation wave of the laser beam becomes unstable, as previously explained theoretically by referring to FIG. 6a.

Figure 8:
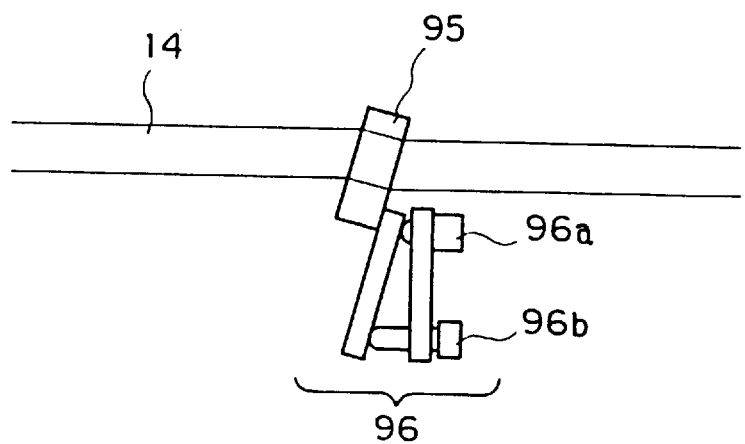
FIG. 8 is an enlarged view of an optical rotation material in the solid-state laser apparatus shown in FIG. 1.

Next, the description will be made as to the function of the angle adjusting instrument 96 for adjusting the angle which the optical rotation material 95 forms with the optical axis of a laser beam incident on the material 95. FIG. 8 is an enlarged view showing the angle adjusting instrument 96 in detail. In the figure, 96a denotes a pressure member having a spring therein, and 96b denotes a micrometer. In order for the optical rotation material 95 to work effectively, the two solid-state materials 3 have to have identical characteristics (e.g. identical dimensions and identical thermal lens effects with respect to pumping inputs). Furthermore, the laser beam 14 must pass through the same parts (e.g. the central portions) of the two solid-state materials 3 in such a manner that the direction of polarization of one laser beam component when passing through the first solid-state material is different from that of the laser beam component when passing through the second solid-state material. To this end, the laser beam 14 must be directed so that it passes through the central portion of each of the solid-state materials 3, and the optical rotation material 95 must rotate the direction of polarization of the laser beam 14 precisely.

Experimental results showed that there is a case where it is necessary to make a fine angle adjustment to the angle which the optical rotation material 95 disposed between the two solid-state materials 3 forms with the optical axis of incident light by means of the angle adjusting instrument 96 so that the laser power becomes stable. Furthermore, there is a case where it is necessary to make a fine angle adjustment to the angle which the optical rotation material 95 forms with the optical axis of incident light according to a change in the excited state of each of the solid-state materials. It can be presumed that that's because an adjustment between the central axes of the plural solid-state materials 3 is needed.

The adjustment between the optical axes of the plural solid-state materials 3 can be performed by rotating the optical rotation material 95 using the angle adjusting instrument 96 so as to change the optical path of incident light by utilizing the refraction of the incident light on the surfaces of the optical rotation material 95, as shown in FIG. 8. It is concluded that the overlapped part in the regions F1 and F2 shown in FIG. 6b can be increased by correcting displacements of the axes of the solid-state materials 3 due to a lack of positioning precision of the materials and by correcting displacements of the optical axes of the thermal lens effects within the solid-state materials 3, which are caused by pumping the solid-state materials 3.

The rotation angle varies as the optical rotation material 95 is inclined with respect to the optical axis of incident light. For example, in the case of the optical rotation material 95 of this embodiment made of crystal which can rotate the direction of polarization of incident light by an angle of about 90°, a variation in the angle which the optical rotation material 95 forms with the optical axis must be within several milliradians in order to control a variation in the rotation angle to within 1% of 90°. In general, displacements of the optical path of light travelling through the optical rotation material can be corrected by an angle adjustment of several milliradians. Especially, in this embodiment, since the solid-state materials 3 are respectively pumped within the condensers with the diffuse reflection surfaces and therefore the pumping distribution is uniform within each of the solid-state materials 3, thermal deformations caused in the solid-state materials are respectively symmetric with respect to the axes of the solid-state materials and hence displacements of the optical axes of the solid-state materials determined by the central axes of thermal distributions in the materials are reduced. Therefore, if adjustments to the optical axes of the solid-state materials are performed to a sufficient degree in the initial setting of the solid-state materials, displacements of the optical axes of the solid-state materials 3 due to pumping are small and hence displacements of the optical path of light traveling through the solid-state materials can be corrected adequately by an angle adjustment of several milliradians to the optical rotation material. Actually, experimental results showed that displacements of the optical axis between the plural solid-state materials 3 can be corrected with having little effect on the rotation angle.

The optical axis of a laser cavity is defined by a line connecting the centers of the curvatures of two mirrors which construct the laser cavity. A variation in each of the positions of the curvature centers of the two mirrors is proportional to the radius of curvature of each of the mirrors. Therefore, when the reflection mirror 1 with a small radius of curvature, for example, which is smaller than 1 m is used, like the present embodiment, a variation in the optical axis with respect to variations in the angles which the mirrors form with the optical axis is small and the operation of the optical rotation material 95 becomes more stable.

As previously mentioned, according to the present embodiment, there is provided an advantage that thermal lens effects caused in the plural solid-state materials 3, which differ according to the direction of polarization of incident light, are the same for different laser beam components at different polarization modes. That is, the thermal lens effects on laser beam components at different polarization modes are equalized. Therefore, losses in the laser beam generating process and variations in the laser power can be reduced and the high-quality laser beam 14 can be generated efficiently and stably.

Furthermore, there is provided another advantage that displacements of the optical axis between the plural solid-state materials 3 can be corrected by rotation of the optical rotation material 95 using the angle adjusting instrument 96.

Furthermore, there is provided another advantage that an uniform laser amplifying medium can be produced efficiently in each of the solid-state materials 3 by pumping the solid-state material uniformly from its surroundings by using again the pumping light 40 which has not been absorbed into the solid-state material 3 and has been reflected off the diffusive reflection surface of the condenser 8.

Furthermore, there is provided another advantage that since the solid state materials 3, pumping light sources 4, condensers 8, optical rotation material 95, reflection mirror 1, and partial reflection mirror 12 are arranged integrally on the base 100, the solid-state laser apparatus can work stably.

The present invention is not limited to the optical rotation material 95 which rotates the direction of polarization of incident light through an angle of about 90°. Alternatively, there can be provided three solid-state materials 3 and two optical rotation materials respectively disposed between two of these solid-state materials 3, each of which can rotate the direction of polarization of incident light through an angle of about 45°. That is, the two optical rotation materials are adapted to rotate the direction of polarization of incident light through a total angle of about 90° in cooperation with each other.

The present invention is not limited to the solid-state laser apparatus of this embodiment which comprises the laser cavity constructed by the mirrors 1 and 12. The aforementioned structure can be applied to a solid-state laser apparatus free of a laser cavity, which serves as an amplifier.

Figure 9:
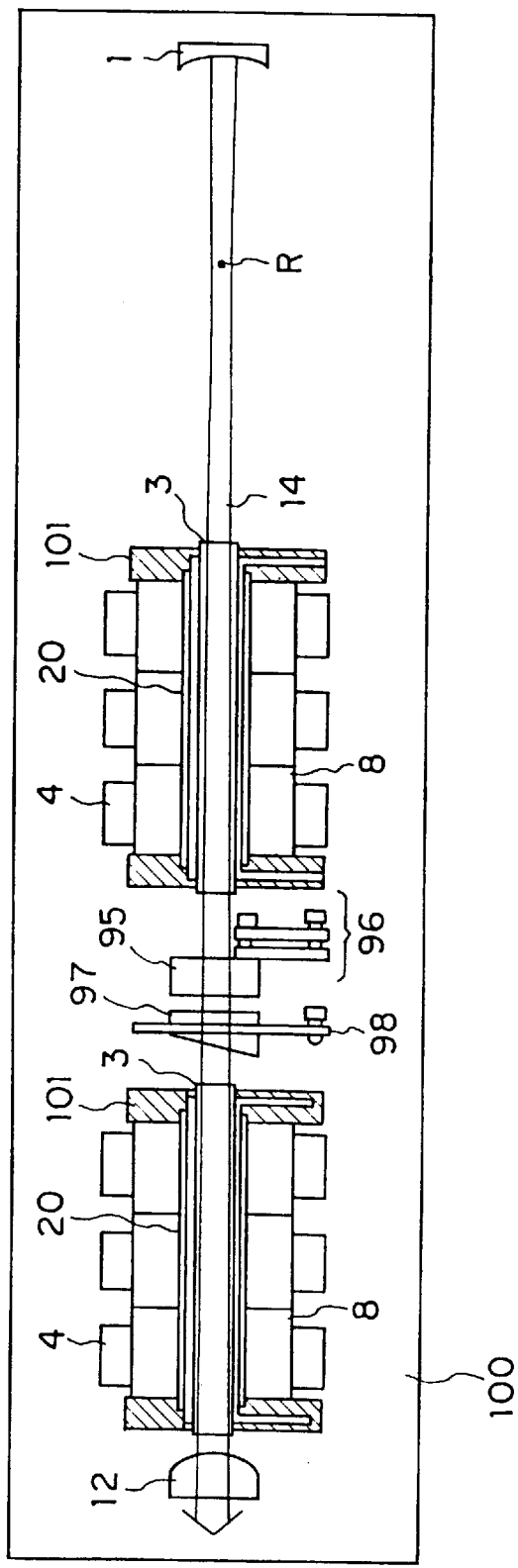
FIG. 9 is a horizontal sectional view of a solid-state laser apparatus according to another embodiment of the present invention.

Referring now to FIG. 9, it illustrates a horizontal sectional view of a solid-state laser apparatus according to another embodiment of the present invention. In the figure, reference numeral 97 denotes a wedge member, i.e., a wedge plate constructed of a material such as glass or crystal. The wedge plate is located between the plural solid-state materials 3 arranged in a row. Reference numeral 98 denotes a rotating unit for rotating the wedge plate 97. In FIG. 9, the same reference numerals as those in FIG. 1 denote the same elements as those of the aforementioned embodiment shown in FIG. 1 or like elements. The structure of the solid-state laser apparatus according to this embodiment is the same as that of the solid-state laser apparatus according to the aforementioned embodiment shown in FIG. 1, with the exception of the wedge plate 97 disposed in the front of the optical rotation material 95.

Next, the description will be directed to the operation of the solid-state laser apparatus of this embodiment. Like the aforementioned embodiment shown in FIG. 1, displacements of the optical axis of the laser beam 14 can be corrected to some extent by rotation of the optical rotation material 95 with respect to the optical axis of the incident laser beam 14. When there occur large displacements of the optical axis, the direction of polarization of incident light must be varied greatly if a correction is made to such displacements of the optical axis by using only the optical rotation material 95. On the other hand, according to this embodiment, the optical axes of the plural solid-state materials 3 can be easily adjusted and coincident with each other by inclining the wedge plate 97 with respect to the optical axis of the laser beam 14 by means of the rotating unit 98. Large displacements of the optical axes can be corrected by a combination of the wedge plate 97 and rotating unit 98.

FIG. 9 shows an example of the laser apparatus wherein only a single wedge plate is used. Alternatively, a plurality of wedge plates can be used. Furthermore, the addition of an angle adjusting instrument to the wedge plate 97 makes it possible to adjust the optical axes of the plural solid-state materials more easily.

As previously mentioned, according to this embodiment, there is provided an advantage that an adjustment to the optical axes of the plural solid-state materials 3 can be easily carried out so that the optical axes of the plural solid-state materials 3 are coincident with each other, and large displacements of the optical axes can be corrected.

In the configuration wherein the optical axes of the plural solid-state materials 3 are adjusted and coincident with each other by means of the wedge plate 97, the laser beam 14 at either of the fundamental polarization modes shown in FIGS. 5a and 5b can be easily generated and the laser power of the laser beam can be increased to some extent without the use of the optical rotation material 95.

Figure 10:
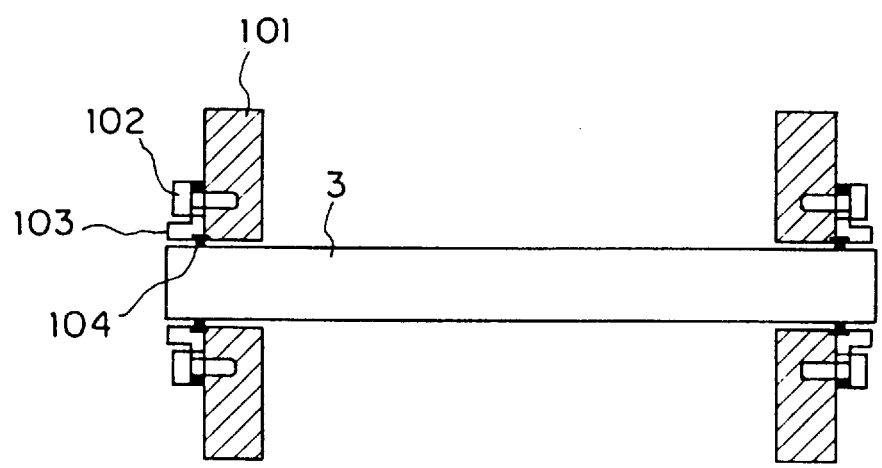
FIG. 10 is a cross-sectional view of a holding member for holding a solid-state material in a solid-state laser apparatus according to another embodiment of the present invention.

Referring now to FIG. 10, it illustrates a cross-sectional view of a holding member for holding a solid-state material 3 and a moving mechanism for moving one end part of the solid-state material 3, which are disposed in a solid-state laser apparatus according to another embodiment of the present invention. In the figure, reference numeral 103 denotes a holder for holding one end part of a solid-state material, 102 denotes a screw for pressuring the holder 103 against the side plate 101 to secure the holder, and 104 denotes an elastic member such as an O ring.

Next, the description will be directed to the operation of the holding member and moving mechanism. In the operation of the moving mechanism for moving an end part of one solid-state material 3 according to this embodiment, the holder 103 is moved vertically and horizontally so that the position of the end part of the solid-state material 3 is moved, and the end part of the solid-state material 3 is fixed by fastening the screws 102. Such an operation of the moving mechanism makes it possible to move one end part of each of a plurality of solid-state materials 3, which are respectively disposed within a plurality of pumping sections, vertically and horizontally to make an adjustment to the optical axes of the plural solid-state materials 3. The optical axis adjusting mechanism according to this embodiment has fewer components than the mechanisms according to the aforementioned embodiments shown in FIGS. 1 and 9.

As previously mentioned, according to this embodiment, there is provided an advantage that the optical axes of the plural solid-state materials 3 can be adjusted and coincident with each other, and the cost of the solid-state laser apparatus can be reduced since the component count of the moving mechanism for adjusting the optical axes of the plural solid-state materials 3 is low.

In the configuration wherein the optical axes of the plural solid-state materials 3 are adjusted by means of the moving mechanism for moving an end part of each of the solid-state materials 3, the laser beam 14 at either of the fundamental polarization modes shown in FIGS. 5a and 5b can be easily generated and the laser power of the laser beam can be increased to some extent without the use of the optical rotation material 95.

Figure 11:
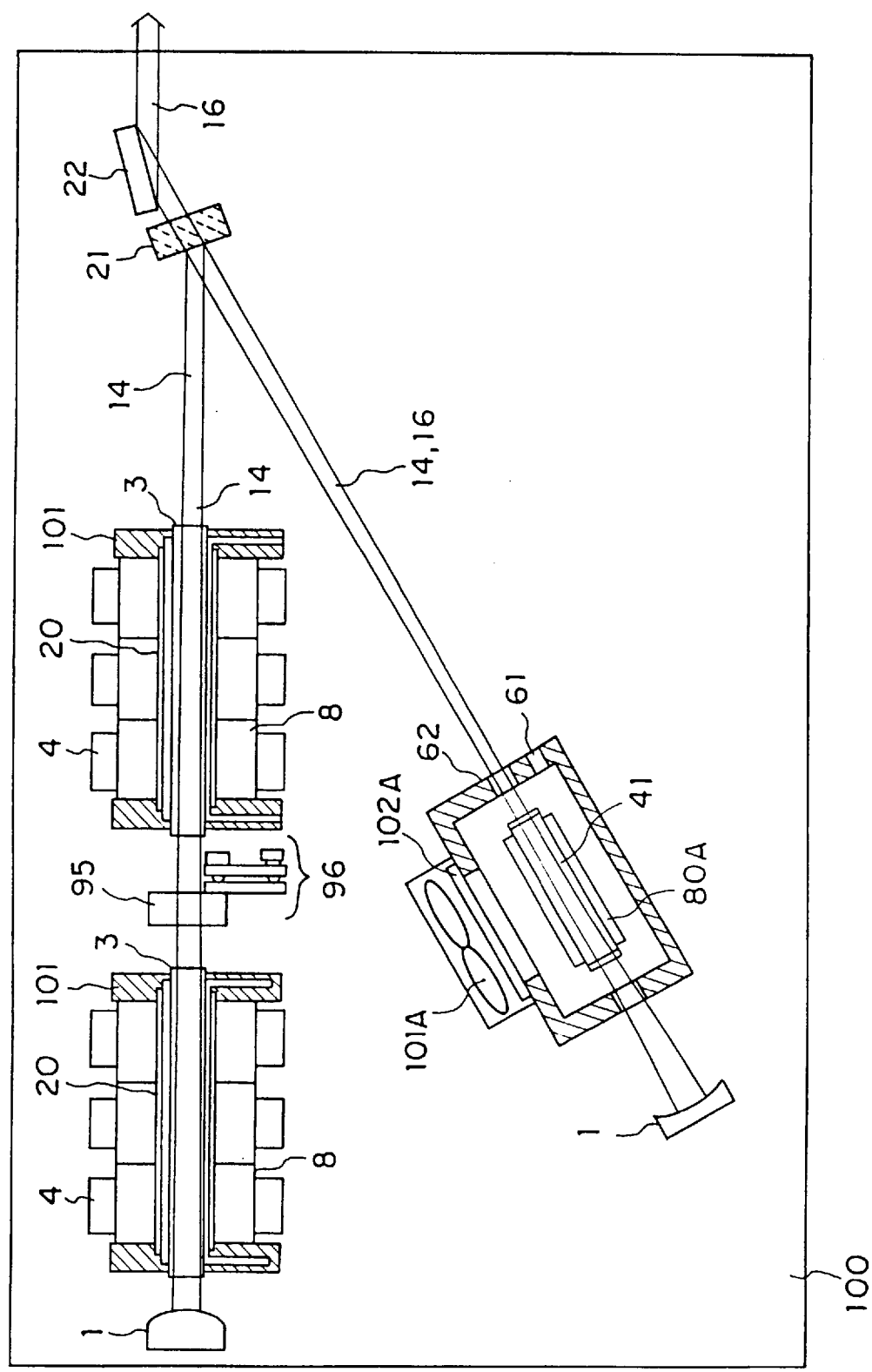
FIG. 11 is a horizontal sectional view of a solid-state laser apparatus according to another embodiment of the present invention.

Referring now to FIG. 11, it illustrates a horizontal sectional view of a solid-state laser apparatus according to another embodiment of the present invention. In the figure, the same reference numerals as those in FIG. 1 denote the same elements as those of the aforementioned embodiment shown in FIG. 1 or like elements. Reference numeral 14 denotes a fundamental wave laser beam emitted by the plural solid-state materials 3, 16 denotes a laser beam, the wavelength of which is converted from that of the laser beam 14, 21 denotes a wavelength selecting reflection mirror having a reflection characteristics dependent on the wavelength of incident light, 22 denotes a reflection mirror, 41 denotes a wavelength converting material, 61 denotes an exhaust opening, 62 denotes a vessel, 80A denotes a temperature controlling mechanism constructed of a temperature control base such as a metal plate for controlling the temperature of the wavelength converting material 41, 101A denotes a fan, and 102A denotes a filter. In this embodiment, the laser cavity is constructed by the two mirrors 1 and 21.

Next, the description will be directed to the operation of the solid-state laser apparatus of this embodiment. In the solid-state laser apparatus having the above-mentioned structure, pumping light emitted by each of the pumping light sources 4 is trapped within a corresponding condenser 8 and is guided to a corresponding solid-state material 3, so that it excites the solid-state material. Laser media generated in the excited solid-state materials 3 produce a laser beam 14 which is confined in the laser cavity constructed by the mirrors 1 and 21. Finally, the high-luminance fundamental wave laser beam 14 is generated in the laser cavity. Then, the wavelength converting material 41 converts the wavelength of the fundamental wave laser beam 14 generated in the laser cavity to produce a wavelength-converted laser beam 16. The mirror 21 has an optical coating which serves to fully reflect the fundamental wave laser beam 14 and fully transmit the wavelength-converted laser beam 16. Most of the wavelength-converted laser beam 16 is extracted out of the laser cavity by the mirror 21. The wavelength-converted laser beam 16 is further deflected by the reflection mirror 22 and is guided to a laser station for machining or the like, so that the laser beam is used for laser cutting, laser welding, laser drilling or laser ablation, or laser pumping for another solid-state material.

In the solid-state laser apparatus having such a structure, the efficiency of wavelength conversion is proportional to the quality and strength of the laser beam incident on the wavelength converting material 41. A high-power and high-quality laser beam 14 can be generated in the same manner that the laser apparatus of the above-mentioned embodiment shown in FIG. 1 operates, by provision of the optical rotation material 95 and angle adjusting instrument 96 capable of adjusting the angle between incident light and the optical rotation material disposed between the two solid-state materials 3. Especially, it is preferable that the quality of the laser beam 14 is about $1/100$ of the theoretical limit of the beam quality, that is, the order of the transverse mode is equal to or less than 100th order. In this case, the effect of the optical rotation material 95 becomes noticeable, as previously mentioned in the description about the aforementioned embodiment shown in FIG. 1. The effect is enhanced by arranging the wavelength converting material 41 in the vicinity of the reflection mirror 1, where the laser beam confined in the laser cavity has the smallest diameter. The conversion efficiency of the wavelength converting material 41 is also a function of temperature. This is why the temperature control bases 80A are adapted to control the temperature of the wavelength converting material 41.

In the arrangement like this embodiment, the effect of the optical rotation material 95 becomes noticeable. The conversion efficiency of the wavelength converting material 41 is dependent on the fundamental wave laser beam 14 incident on the material 41. A variation in the power of the fundamental wave laser beam 14 causes a variation in the wavelength conversion efficiency. Then, the variation in the wavelength conversion efficiency causes a further variation in the power of the fundamental wave laser beam 14 confined in the laser cavity. Thus, a conventional solid-state laser apparatus suffers from a disadvantage that a small variation in the power of the fundamental wave laser beam is amplified with time and this results in a big variation in the power of the wavelength-converted laser beam 16 which is extracted out of the laser cavity. Contrasted with such a prior art laser apparatus, since the solid-state laser apparatus of this embodiment includes the optical rotation material 95, the overlapped part in the oscillation regions for two different polarization modes can be made wide, as shown in FIG. 6b, and hence variations in the power of the fundamental wave can be almost eliminated.

When the power of the fundamental wave laser beam 14 is increased, a part of the fundamental wave laser beam 14 can be absorbed into the wavelength converting material 41, resulting in thermal deformations within the wavelength converting material 41. When the wavelength converting material 41 in the cross-sectional shape of a rectangle is used, the distribution of thermal deformations is produced such that each of curved lines which join together points of equal thermal deformation is in the shape of a rectangle. In this case, since the temperature of the wavelength converting material is controlled through only a bottom plate, the center of the thermal deformation distribution can be moved off the optical axis of incident light. It is presumed that if the optical rotation material 95 is not inserted between the solid-state materials, the overlapped part in the two polarization mode regions E1 and E2 is further made narrow, as shown in FIG. 6a. Contrasted with such an arrangement, according to this embodiment, the optical rotation material 95 serves to increase the width of the overlapped part in the two polarization mode regions F1 and F2 shown in FIG. 6b, as previously mentioned. As a result, the wavelength-converted laser beam 16 can be extracted out of the laser cavity stably. Actually, experimental results showed that the power of the wavelength-converted laser beam 16 changed randomly and considerably and became unstable through the elimination of the optical rotation material 95 from the solid-state laser apparatus shown in FIG. 11, and, in contrast, the power of the wavelength-converted laser beam 16 became stable by provision of the optical rotation material 95.

In the laser cavity having a deflection mirror like the mirror 21 shown in FIG. 10, an elliptically polarized laser beam can be produced within the laser cavity in such a manner that the major axis of the elliptical polarization is in parallel with the surface of the page including the drawing, because the reflectance of the deflection mirror differs according to whether the direction of polarization of incident light is perpendicular to or in parallel with the surface of the page including the drawing. The elliptically polarized laser beam 14 cannot be produced unless two laser beam components at the fundamental polarization modes shown in FIGS. 5a and 5b are generated simultaneously. In order for the solid-state laser apparatus to oscillate at the two modes, it must operate in a state wherein the overlapped part in the regions F1 and F2 is wide, as shown in FIG. 6b. Therefore, in a laser cavity using such a deflection mirror, the effect of the above-mentioned structure utilizing the optical rotation material 95 disposed between the plural solid-state materials 3 is enhanced.

When the wavelength converting material 41 is heated, the power of the wavelength-converted laser beam 16 becomes more stable by varying the angle which the optical rotation material 95 forms with incident light according to a variation of the input power of each of the pumping light sources 4 by means of the angle adjusting instrument 96.

As previously explained, according to this embodiment, there is provided an advantage that a high-quality and high-power fundamental wave laser beam 14 can be efficiently produced in the vicinity of the wavelength converting material 41, wavelength conversion can be efficiently carried out for the fundamental wave laser beam 14, and a high-power wavelength-converted laser beam 16 can be generated stably.

Figure 12:
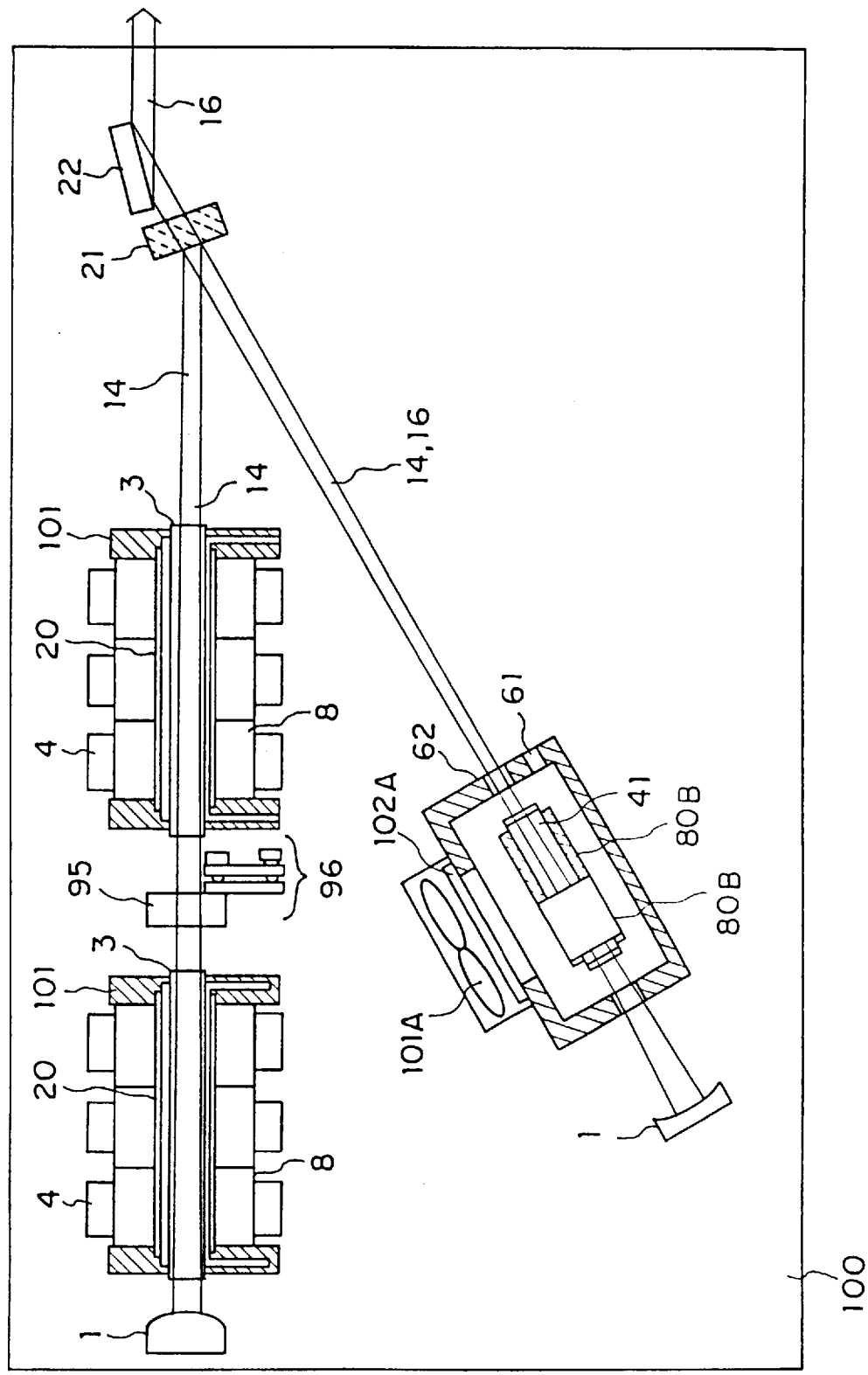
FIG. 12 is a horizontal sectional view of a solid-state laser apparatus according to another embodiment of the present invention.

Referring now to FIG. 12, it illustrates a horizontal sectional view of a solid-state laser apparatus according to another embodiment of the present invention. In the figure, the same reference numerals as those in FIG. 11 denote the same elements as those of the aforementioned embodiment shown in FIG. 11 or like elements. In this embodiment, a single wavelength converting material 41 is sandwiched by two pairs of temperature control plates 80B, which are respectively arranged vertically and horizontally, for controlling the temperature of the wavelength converting material 41. The two pairs of temperature control plates 80B are constructed of for example a metallic plate.

Next, the description will be directed to the operation of the solid-state laser apparatus of this embodiment. The wavelength converting material 41 is divided into two portions along its length for controlling the temperatures of the portions individually. That is, the temperature of one portion of the wavelength converting material 41 is controlled by one pair of temperature control plates 80B disposed vertically in cross section of the wavelength converting material 41, which is perpendicular to the optical axis of the wavelength converting material 41. Furthermore, the temperature of the other portion of the wavelength converting material 41 is controlled by the other pair of temperature control plates 80B disposed horizontally in cross section of the wavelength converting material 41, which is perpendicular to the optical axis of the wavelength converting material 41. The temperature control is carried out by a combination of the temperature controls for the two portions so that the distribution of thermal deformations within at least the central part in cross section of the wavelength converting material 41 is symmetric with respect to the central axis of the wavelength converting material 41, and thermal deformations within the wavelength converting material 41 and thermal deformations within each of the solid-state materials 3 are geometrically similar.

Figure 13:
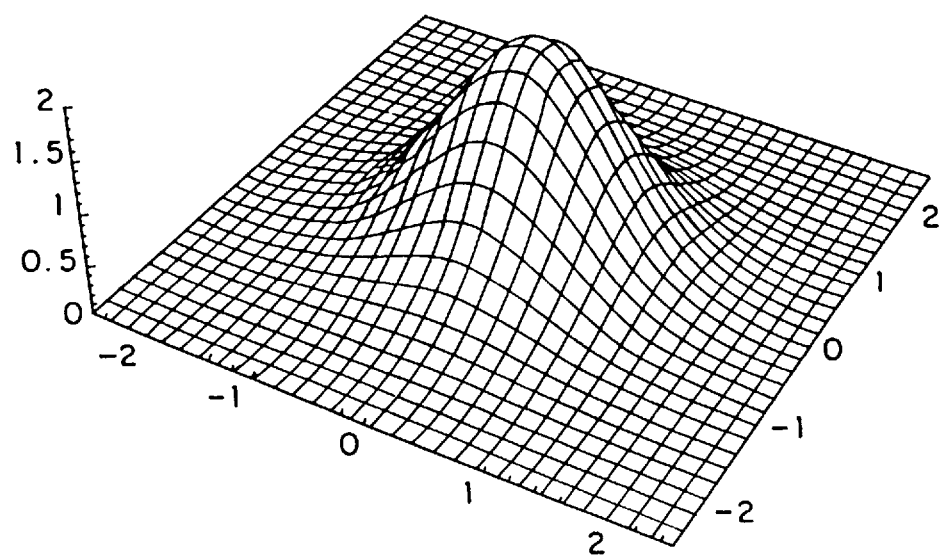
FIG. 13 is a view showing thermal deformations generated within one solid-state material in the solid-state laser apparatus according to the embodiment shown in FIG. 12.

Next, a method of controlling the temperature of the wavelength converting material according to this embodiment will be explained in detail. FIG. 13 is a three-dimensional view showing a distribution of index of refraction which appears according to a distribution of temperature generated within one solid-state material 3. On the other hand, for example, when the wavelength converting material 41 in the cross-sectional shape of a rectangle is sandwiched and cooled by a pair of temperature control plates 80B arranged vertically, a vertical distribution of temperature is generated. Due to the vertical distribution of temperature, a distribution of index of refraction as shown in FIG. 14a appears within the wavelength converting material 41.

Figure 14A:
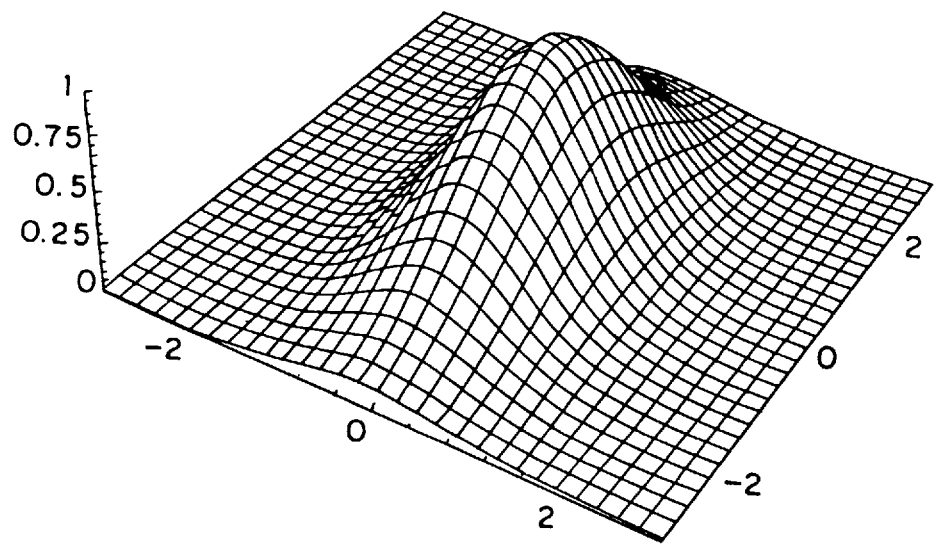
FIGS. 14a and 14b are views showing thermal deformations generated within a wavelength converting material in the solid-state laser apparatus according to the embodiment shown in FIG. 12.

The three-dimensional plot in FIG. 14a showing the distribution of index of refraction generated within the wavelength converting material 41 differs considerably from that in FIG. 13 showing the distribution of index of refraction generated within each of the solid-state materials 3. The laser beam 14 generated in the laser cavity has a cross-sectional distribution of phase which corresponds to a distribution of index of refraction generated within each of the solid-state materials 3. Therefore, if the distribution of index of refraction generated within the wavelength converting material 41 differs from the distribution of index of refraction generated within each of the solid-state materials 3, the distribution of phase of the laser beam 14 is disturbed and the oscillating condition is disturbed.

Thus, since the quality of the laser beam 14 is reduced and the operating point at which the laser apparatus can oscillate within the laser cavity is shifted when the distribution of phase of the laser beam 14 is disturbed, a loss is generated within the laser cavity and hence the laser power is decreased. The reduction of the laser beam quality and decrease in the laser power result in a remarkable reduction of the power of the wavelength-converted laser beam.

Figure 14B:
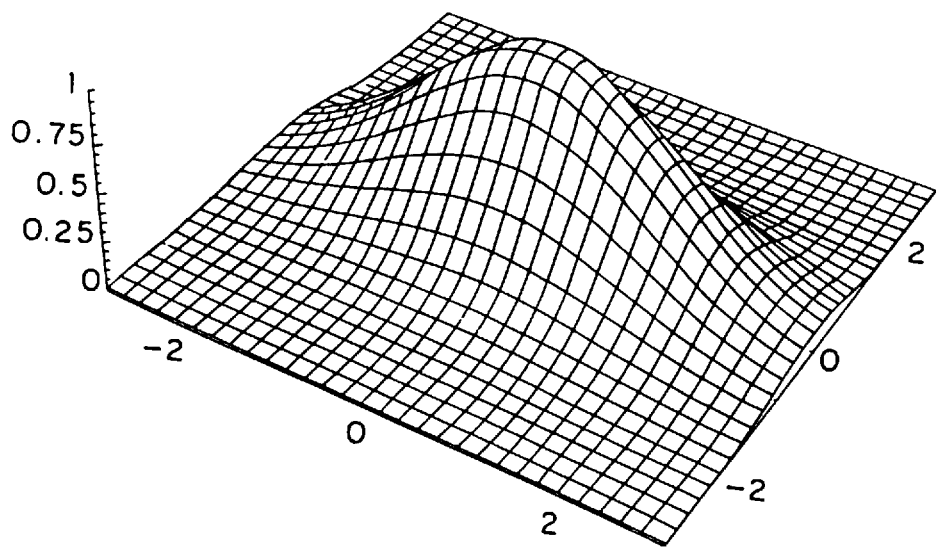

In the present embodiment, in order to prevent such a reduction of the power of the wavelength-converted laser beam, the two portions of the wavelength converting material 41 are cooled individually so that the directions of cooling in the two portions are different from each other and the shape of a distribution of index of refraction within the wavelength converting material 41 and shape of a distribution of index of refraction within each of the solid-state materials 3 are geometrically similar. For example, when one portion of the wavelength converting material 41 is cooled by one pair of temperature control plates 80B arranged vertically, a distribution of index of refraction as shown in FIG. 14a appears within the wavelength converting material 41. Furthermore, when the other portion of the wavelength converting material 41 is cooled by the other pair of temperature control plates 80B arranged horizontally, a distribution of index of refraction as shown in FIG. 14b appears within the wavelength converting material 41. Therefore, when the wavelength converting material 41 is cooled by the two pairs of temperature control plates 80B simultaneously, a distribution of index of refraction which appears within the wavelength converting material 41 corresponds to a synthesis of the distributions of index of refraction shown in FIGS. 14a and 14b. The synthesis of the distributions of index of refraction when viewed from the optical axis of the wavelength converting material 41 is shown in FIG. 15. The synthesis of the distributions of index of refraction can be nearly symmetric with respect to the optical axis of the wavelength converting material 41 and can be similar to the distribution of index of refraction within each of the solid-state materials 3, as shown in FIG. 13, which appears according to a distribution of temperature generated in each of the solid-state materials 3. Therefore, oscillations in a high-power region can become stable.

As previously mentioned, according to this embodiment, there is provided an advantage that a high-quality and high-power fundamental wave laser beam 14 can be efficiently produced in the vicinity of the wavelength converting material 41, wavelength conversion can be efficiently carried out for the fundamental wave laser beam 14, and a high-power wavelength-converted laser beam 16 can be generated more stably as compared with the aforementioned embodiment shown in FIG. 11.

Figure 16:
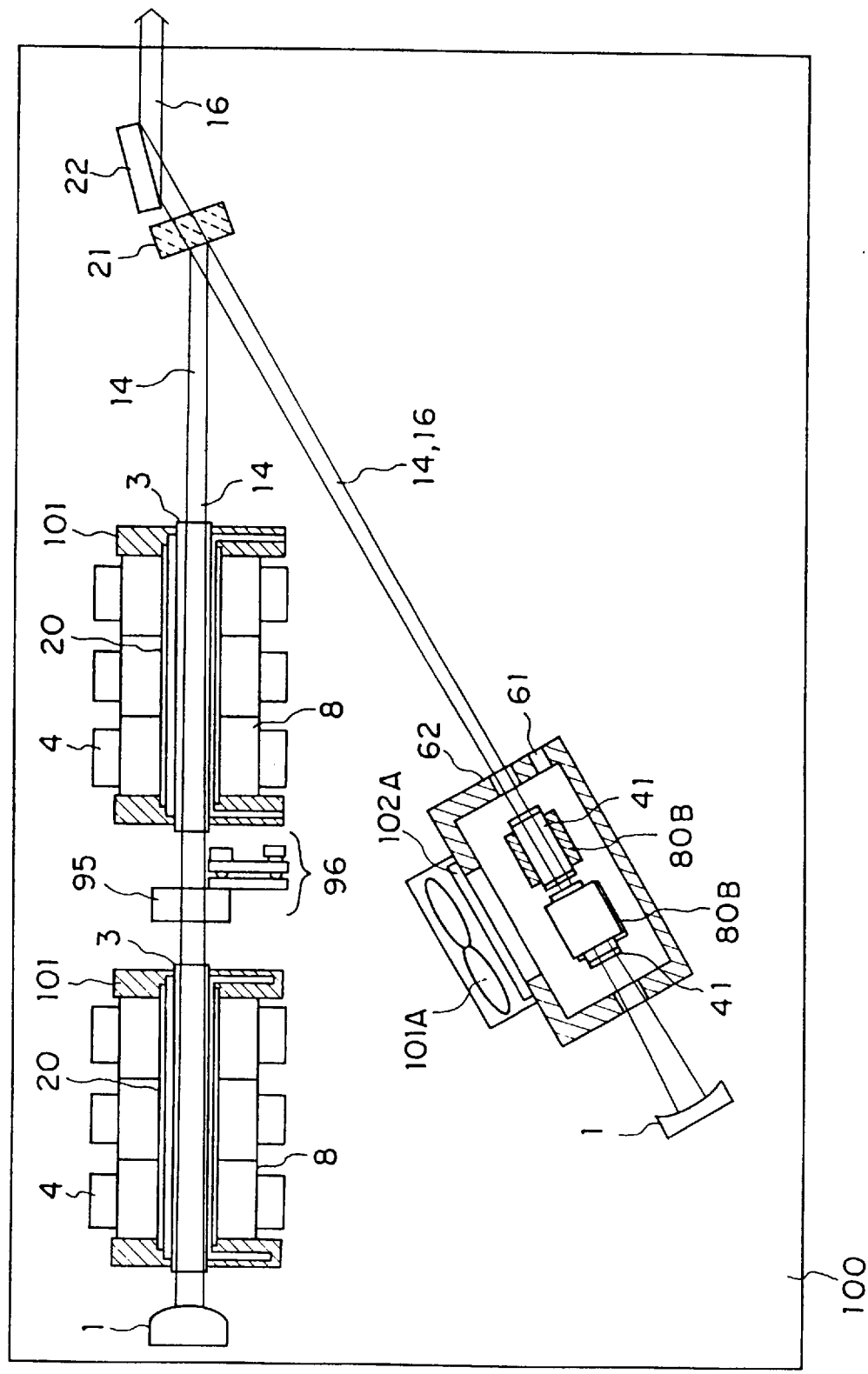
FIG. 16 is a horizontal sectional view of a solid-state laser apparatus according to another embodiment of the present invention.

Referring now to FIG. 16, it illustrates a horizontal sectional view of a solid-state laser apparatus according to another embodiment of the present invention. In the figure, the same reference numerals as those in FIG. 11 denote the same elements as those of the aforementioned embodiment shown in FIG. 11 or like elements. In this embodiment, the two wavelength converting materials 41 are arranged in a row along their optical axes with a predetermined space. Furthermore, the two wavelength converting materials 41 are respectively sandwiched by two pairs of temperature control plates 80B, which are respectively arranged vertically and horizontally.

Next, the description will be directed to the operation of the solid-state laser apparatus of this embodiment. The temperatures of the two wavelength converting materials 41 are controlled individually. That is, the temperature of one wavelength converting material 41 is controlled by one pair of temperature control plates arranged vertically in cross section, which is perpendicular to the optical axis of the wavelength converting material 41, and the temperature of the other wavelength converting material 41 is controlled by the other pair of temperature control plates arranged horizontally. The temperature control is carried out by a combination of the temperature controls for the two wavelength converting materials 41 so that a synthesis of the distributions of thermal deformations in at least the central parts in cross sections of the wavelength converting materials 41 is symmetric with respect to the central axes of the wavelength converting materials 41, and a synthesis of thermal deformations generated within the two wavelength converting materials 41 and thermal deformations generated within each of the solid-state material 3 are geometrically similar.

Like the aforementioned embodiment shown in FIG. 12, such the structure of this embodiment makes it possible to make the synthesis of distributions of index of refraction, which appear within the wavelength converting materials 41, nearly symmetric with respect to the optical axes of the wavelength converting materials 41 and similar to the distribution of index of refraction within each of the solid-state materials 3, which appears according to a distribution of temperature generated in each of the solid-state materials 3. Accordingly, oscillations in a high-power region can become stable.

Furthermore, the provision of the two wavelength converting materials 41 makes it possible to add a means for controlling the temperatures of the wavelength converting materials 41 individually to the laser apparatus, with relative ease. Since the flow of heat within each of the wavelength converting materials 41 is simplified as compared with that in the aforementioned embodiment shown in FIG. 12, the temperature control can be carried out easily. Therefore, the temperatures of the two wavelength converting materials 41 can be controlled so that a synthesis of the distributions of thermal deformations in at least the central parts in cross sections of the wavelength converting materials 41 is symmetric with respect to the central axes of the wavelength converting materials 41, and a synthesis of thermal deformations generated within the two wavelength converting materials 41 are more similar to thermal deformations generated within each of the solid-state materials 3. Accordingly, oscillations in a high-power region become extremely stable.

As previously mentioned, according to this embodiment, there is provided an advantage that a high-quality and high-power fundamental wave laser beam 14 can be efficiently produced in the vicinity of the wavelength converting material 41, wavelength conversion can be efficiently carried out for the fundamental wave laser beam 14, a high-power wavelength-converted laser beam 16 can be generated stably, and temperature control can be carried out for the wavelength converting materials 41 more easily as compared with the aforementioned embodiment shown in FIG. 12.

Figure 17:
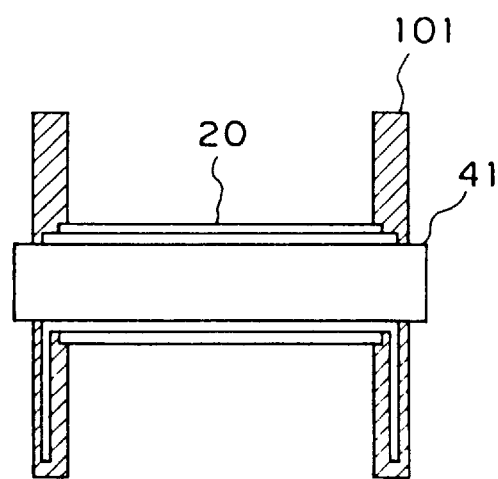
FIG. 17 is an enlarged cross-sectional view of a wavelength converting material in a solid-state laser apparatus according to another embodiment of the present invention.

Referring now to FIG. 17, it illustrates a horizontal sectional view of a solid-state laser apparatus according to another embodiment of the present invention. In the figure, the same reference numerals as those in FIG. 16 denote the same elements as those of the aforementioned embodiment shown in FIG. 16 or like elements. Reference numeral 20 denotes a flow tube enclosing a wavelength converting material 41 therein. In this embodiment, the wavelength converting material 41 is so constructed that its cross-sectional shape is the same as that of the solid-state materials 3.

Next, the description will be directed to the operation of the solid-state laser apparatus of this embodiment. The cylindrical wavelength converting material 41 is cooled by water so that a distribution of thermal deformations in cross section of the wavelength converting material 41 is nearly similar to a distribution of thermal deformations in cross section of each of the solid-state materials 3. The structure of the temperature control mechanism is the same as that used for one solid-state material 3 as shown in FIG. 2a. The cylindrical wavelength converting material 41 is cooled by cooling water which flows between the flow tube 20 and the wavelength converting material 41. The side plate 101 constructs the water path in cooperation with the flow tube.

This structure can also control the temperature of the wavelength converting material 41 so that a distribution of thermal deformations when viewed from the optical axis of the wavelength converting material 41 is more similar to a distribution of thermal deformations within each of the solid-state materials 3. Therefore, oscillations in a high-power region can become stable.

As previously mentioned, according to this embodiment, there is provided an advantage that a high-quality and high-power fundamental wave laser beam 14 can be efficiently produced in the vicinity of the wavelength converting material 41, wavelength conversion can be efficiently carried out for the fundamental wave laser beam 14, and a high-power wavelength-converted laser beam 16 can be generated stably.

In accordance with the temperature control mechanism of this embodiment for the wavelength converting material 41, the laser beam 14 at either of the fundamental polarization modes shown in FIGS. 5a and 5b can be easily generated and the laser power of the laser beam can be increased to some extent without the use of the optical rotation material 95.

Furthermore, the structure of this embodiment is not limited to a solid-state laser apparatus having a plurality of solid-state materials 3 as mentioned above. The temperature control mechanism can be applied to a solid-state laser apparatus having only a solid-state material 3.

Figure 18:
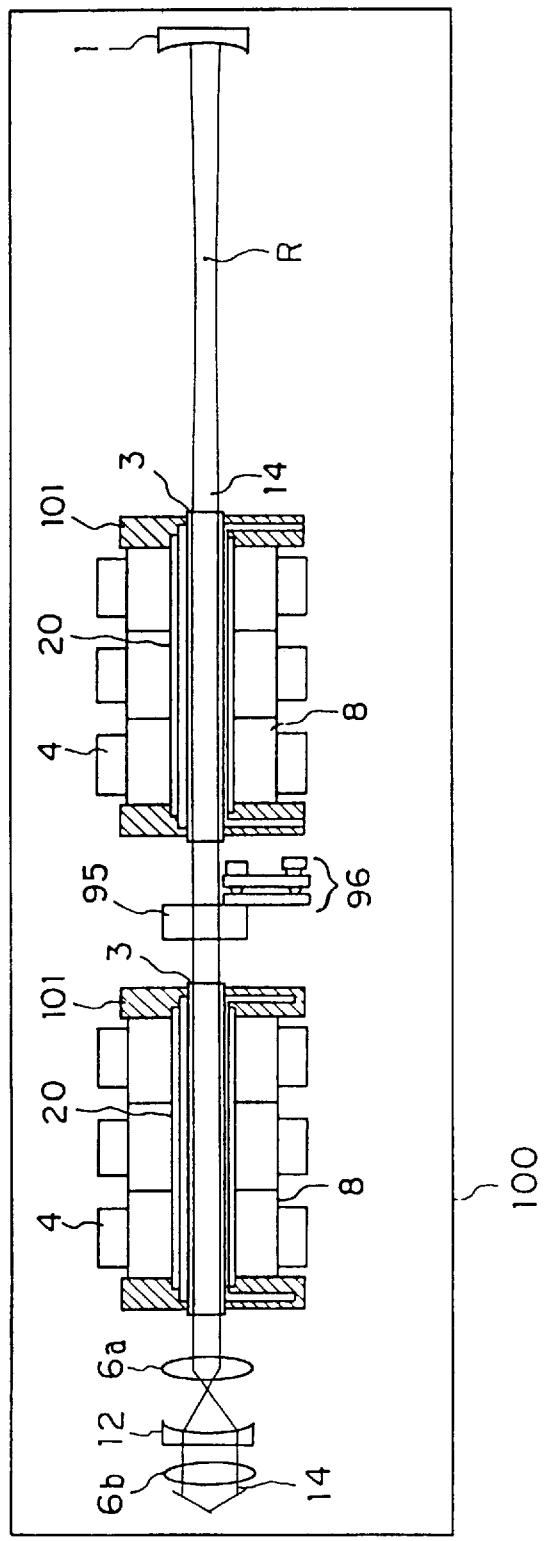
FIG. 18 is a horizontal sectional view of a solid-state laser apparatus according to another embodiment of the present invention.

FIG. 18 is a cross-sectional view of a solid-state laser according to another embodiment of the present invention. In the figure, the same reference numerals as those shown in FIG. 1 denote the same or corresponding components. Reference numerals 6a, 6b denote lenses. In this embodiment, a so-called image transcribing optical system constructed of the lenses 6a, 6b and a partial reflection mirror 12 is employed instead of the partial reflection mirror 12 of the embodiment as shown in FIG. 1.

Next, the description will be directed to the operation of the solid-state laser. In the solid-state laser having the above-mentioned structure, a laser beam 14 with a substantially constant laser beam diameter is outwardly emitted so that a laser beam pattern in the vicinity of end surfaces of the solid-state materials 3 can be transferred to the partial reflection mirror 12. The emitted laser beam 14 is converted into parallel light by the lens 6a and introduced to a laser working station or the like for use in, e.g., laser cutting, welding working, laser drilling, laser ablation and pumping another solid-state material.

Like the embodiment as shown in FIG. 1, in this embodiment, there are provided an optical rotation material 95 which is positioned at least at one place between a plurality of solid-state materials 3 arranged in a row, and an angle adjusting mechanism for adjusting an angle of the optical rotation material 95. Since the solid-state laser is constructed in such a manner that the angle adjusting mechanism 96 finely adjusts optical axes between the plural solid-state materials 3, the thermal lens effects for laser beams at different polarization modes generated in the plural solid-state materials 3 become equal, thus reducing losses and fluctuations of the laser cavity. As a result, the laser beam 14 with a high quality can be efficiently stably generated.

The so-called image transcribing optical system constructed of the lenses 6a, 6b and partial reflection mirror 12 is equivalent to the partial reflection mirror 12 having a curvature in the vicinity of an end surface of a solid-state materials 3, and effects the same operation as that thereof. Its curvature can be changed by changing the distances between the partial reflection mirror 12 and lenses 6a, 6b. Thus, for example, when each of the solid-state materials 3 is pumped and thermally deformed to have a thermal lens effect; the thermal lens effect can be compensated by changing the equivalent curvature of the image transcribing optical system.

In this case, if the distances between the partial reflection mirror 12 and lenses 6a, 6b are moved by piezo elements, the thermal lens effects of the solid-state materials 3 can be compensated at a high speed.

By this thermal lens effect compensation, a stable region, which is at the center of the operating region designated by overlap of the curved lines E1 and E2 as shown in FIG. 6a with which the operation of the above embodiment was explained, can be moved. Thus, oscillation can always occur at the stable region corresponding to fluctuations of the power of pumping light sources 4.

As stated above, according to this embodiment, since the thermal lens effects for laser beams at different polarization modes generated in the plural solid-state materials 3 become equal, losses and fluctuations in laser beam generation can be reduced, and therefore the laser beam 14 with a high quality can be efficiently stably generated. Furthermore, by moving the distances between the partial reflection mirror 12 and lenses 6a, 6b with piezo elements, the thermal lens effects of the solid-state materials 3 can be compensated at a high speed.

It should be noted that this thermal lens effect compensating optical system can be applied to not only the embodiment as shown in FIG. 1 but also other embodiments.

Figure 19:
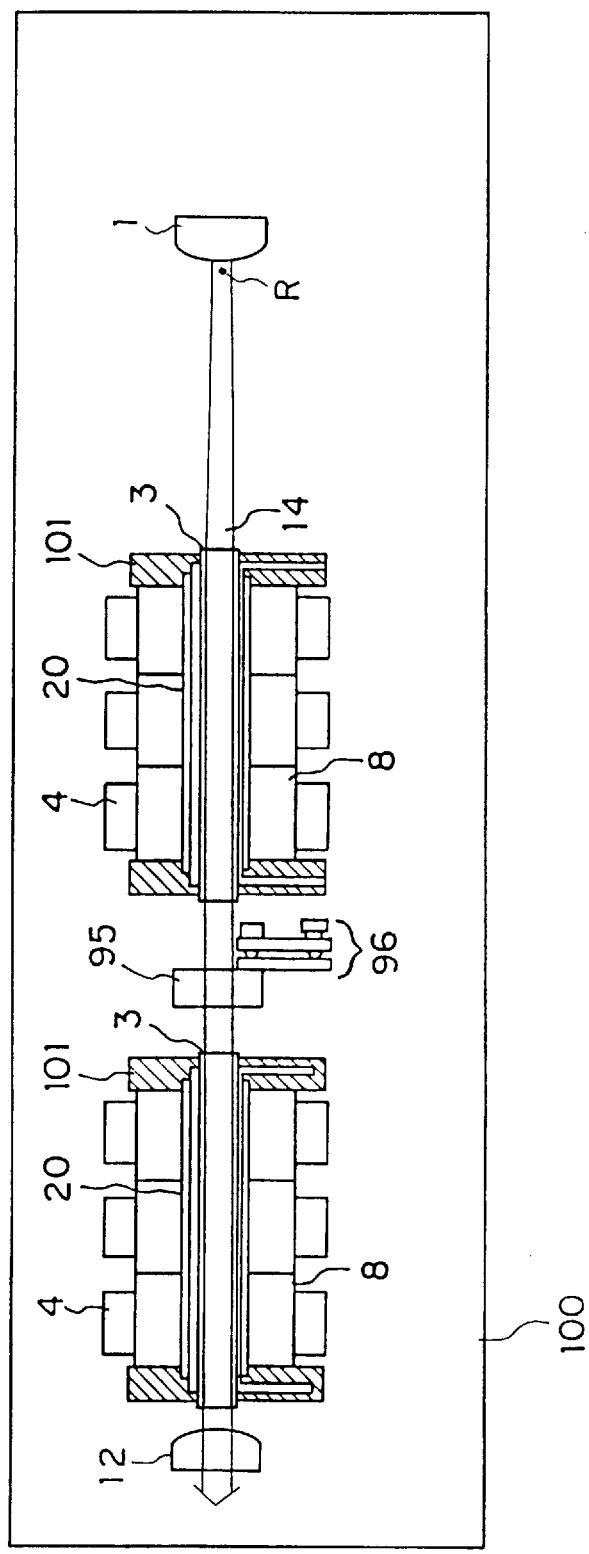
FIG. 19 is a horizontal sectional view of a solid-state laser apparatus according to a variant of the embodiment shown in FIG. 18.

Moreover, the structure of a laser cavity which can be used in this embodiment is not limited to the above-mentioned structure. Any laser cavity can be used which has a structure where the beam diameter of the laser beam 14 inside or in the vicinity of either of the solid-state materials 3 is larger than that at the condensing point R of the laser beam 14. For example, as shown in FIG. 19, a small convex mirror with a curvature of 1 m or less may be provided as a reflection mirror 1.

Such a structure allows a compact laser cavity with a short length while maintaining a light path in the vicinity of the solid-state materials 3 to be almost the same as that of the embodiment as shown in FIG. 1.

Figure 20:
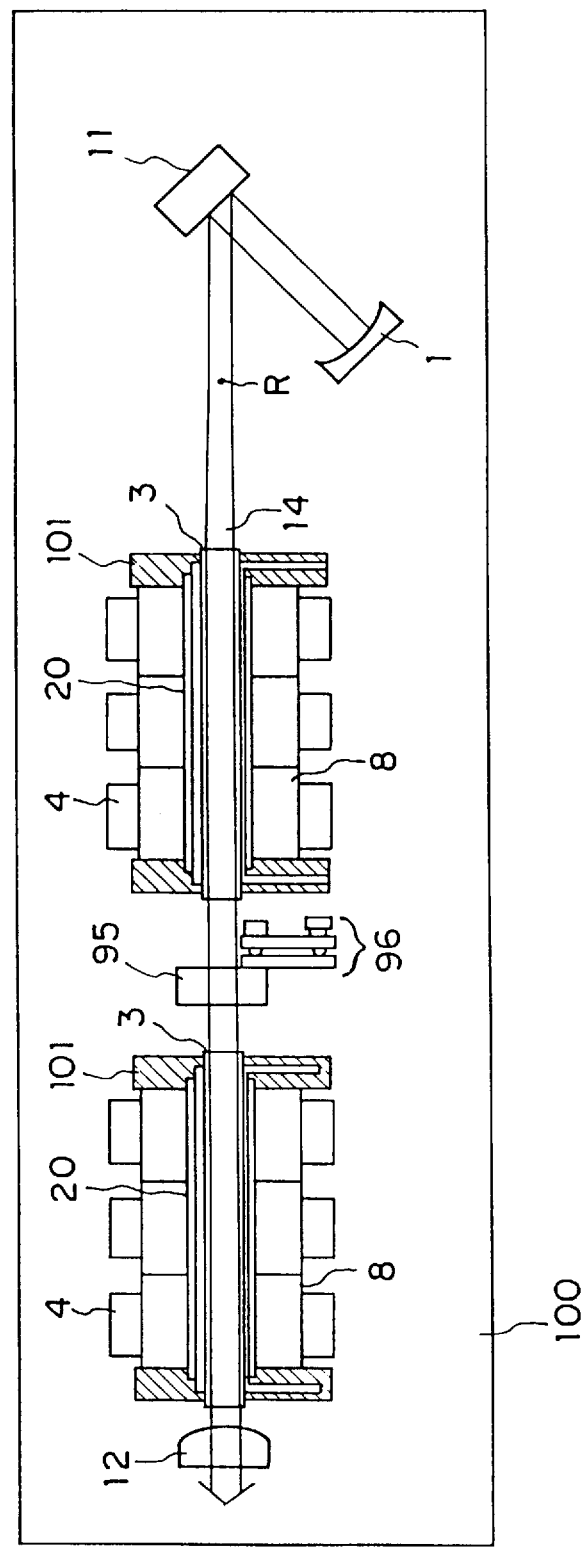
FIG. 20 is a horizontal sectional view of a solid-state laser apparatus according to a variant of the embodiment shown in FIG. 18.
Figure 21:
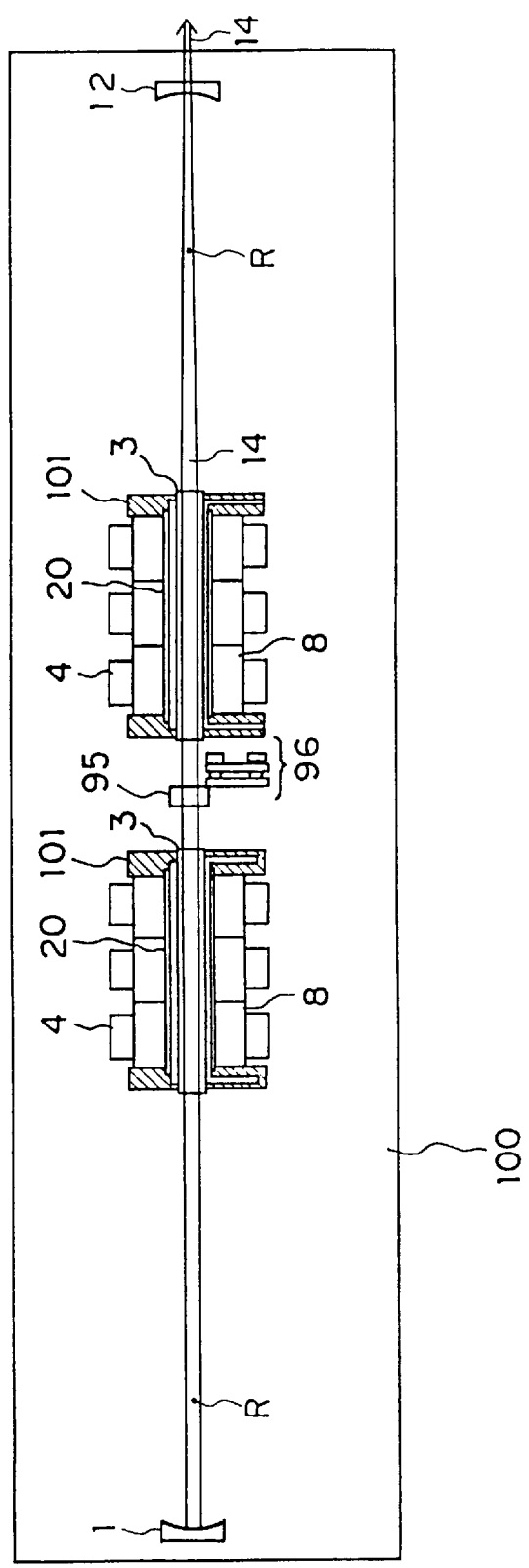
FIG. 21 is a horizontal sectional view of a solid-state laser apparatus according to a variant of the embodiment shown in FIG. 18.
Figure 22:
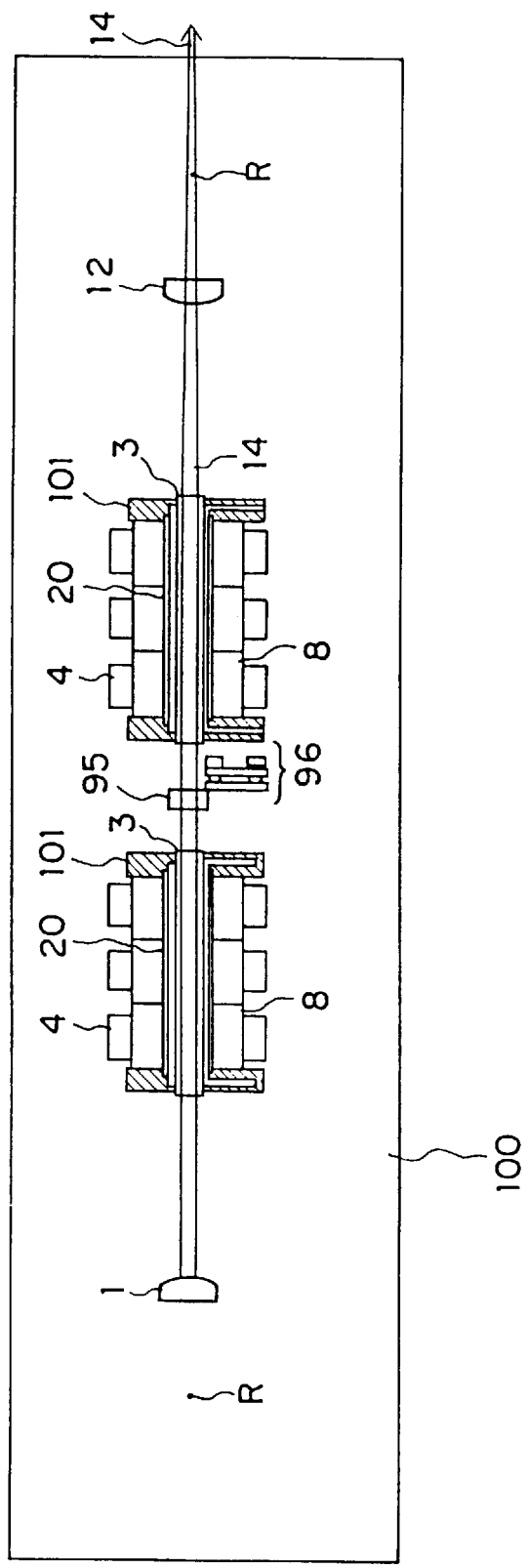
FIG. 22 is a horizontal sectional view of a solid-state laser apparatus according to a variant of the embodiment shown in FIG. 18.
Figure 23:
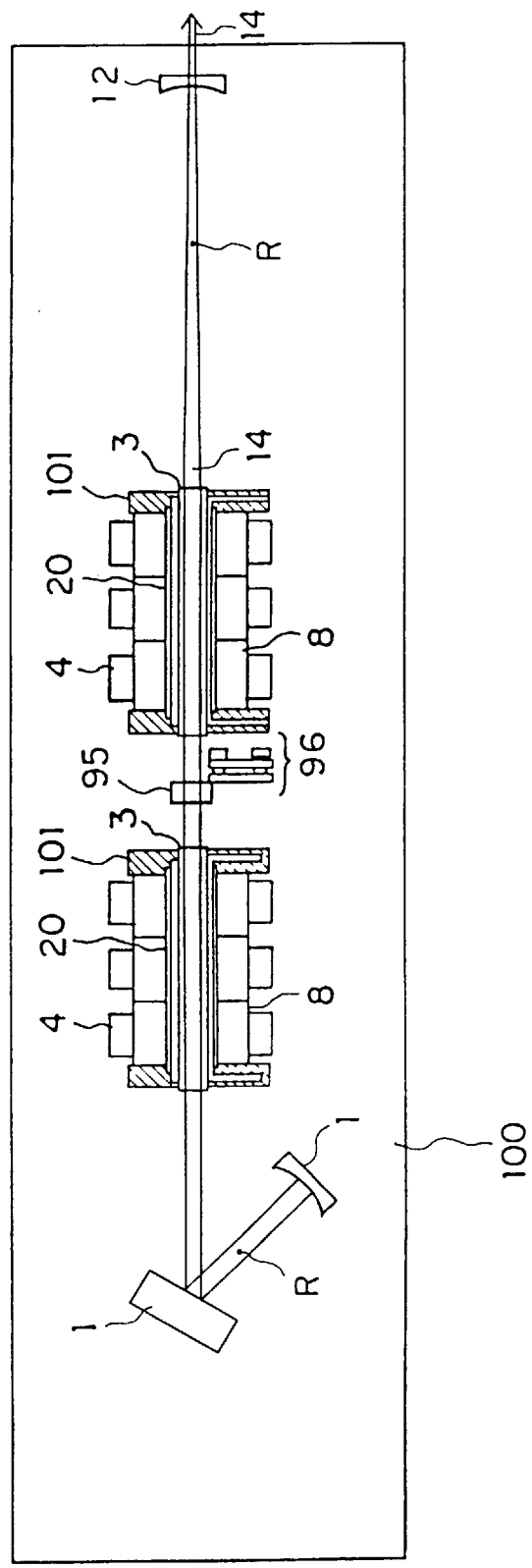
FIG. 23 is a horizontal sectional view of a solid-state laser apparatus according to a variant of the embodiment shown in FIG. 18.

As shown in FIG. 20, a laser cavity may be folded by a folding mirror 11 to shorten the length of the laser. Furthermore, as shown in FIGS. 21 and 22, small mirrors, e.g., with a curvature of 1 m or less may be provided at both the sides. In addition, for example, as shown in FIG. 23, a folding mechanism may be provided.

In the laser cavity using the folding mirror 11, the reflectance of the folding mirror 11 in the vertical direction to the paper is different from that in the horizontal direction. For this reason, a polarized beam in the laser cavity may be an elliptically polarized beam whose long axis is along the paper direction. When the two basic polarization modes as shown in FIGS. 5a and 5b oscillate at the same time, the elliptically polarized laser beam 14 can be realized. Namely, the diameter of a laser beam in the solid-state materials 3 is required to be at a state where the overlapped part is large as shown in FIG. 6 (b). Thus, in the solid-state laser with the laser cavity using such a folding mirror 11, the effects obtained by the structure of the plural solid-state materials 3 arranged in a row and optical rotation material 95 can be further enhanced.

Although either of the above embodiments shows the structure where the partial reflection mirror 12 is provided in the vicinity of the solid-state material 3, there is no limitation thereto. A laser beam 14 can be extracted by using any mirror as a partial reflection mirror.

Although in either of the above embodiments the solid-state laser has the angle adjusting mechanism for adjusting an angle relative to the optical axis of the optical rotation material 95, adjustment may be conducted by improvement in accuracy of initialization or in a movable range of a mounting screw.

Although the embodiments using two solid-state materials are described above, there is no limitation thereto. The number of solid-state materials may be more than two. In such a case, optical rotation materials 95 may be positioned at all the places or at some selected places between the solid-state materials 3.

Furthermore, wedge-like members may be also positioned at all the places or at some selected places between the solid-state materials 3.

Furthermore, mechanisms for moving an end part of a solid-state material 3 in right, left, upper and lower directions may be also provided with all the solid-state materials 3 or some selected materials 3.

Figure 24A:
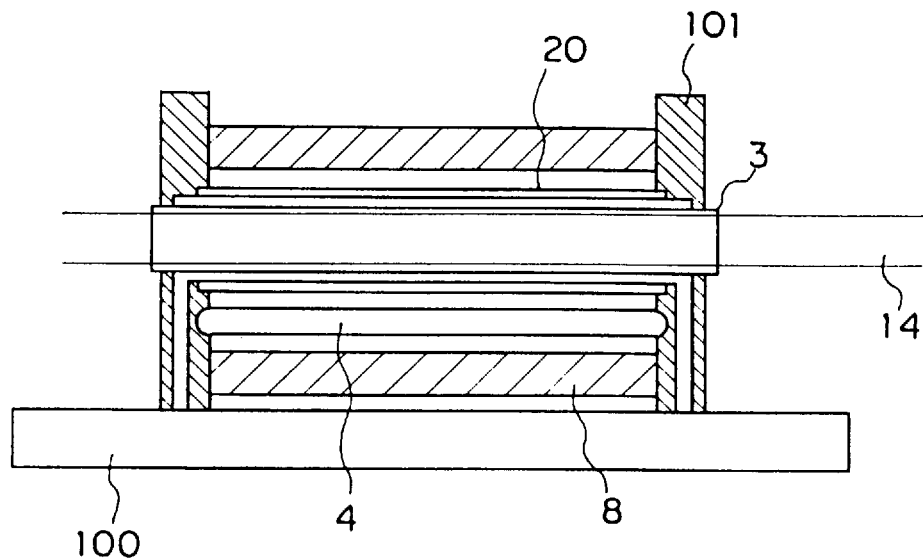
FIG. 24a is a longitudinally vertical sectional view of a solid-state laser apparatus according another embodiment of the present invention.
Figure 24B:
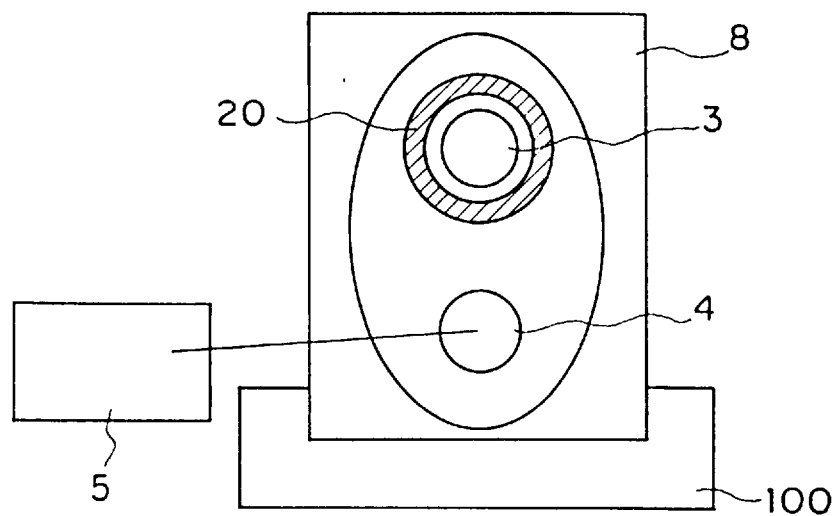
FIG. 24b is a transversely vertical sectional view of the solid-state laser apparatus of the above embodiment.

FIG. 24a is a longitudinal sectional view showing in detail a pumping section according to another embodiment of the present invention. FIG. 24b is a cross sectional view thereof. In the figure, the same reference numerals as those shown in FIGS. 2a and 2b denote the same or corresponding components. According to this embodiment, a sectional shape of a condenser 8 is an ellipse. A solid-state material 3 and a pumping light source 4 as an arc lamp are respectively located at focal lines in the elliptic condenser 8.

Next, the description will be directed to the operation of the pumping section. When a power supply 5 switches on a pumping light source 4, pumping light emitted by the light source is diffusely reflected in a condenser 8 to uniformly pump a solid-state material 3 from the surrounding thereof. In a case of a condenser 8 with a diffuse reflection condensing surface as mentioned in the above embodiment, if the power of the pumping light source 4 is small, the condenser 8 allows the formation of a substantially uniform laser medium in a section of the solid-state material 3. On the other hand, if the power of the pumping light source 4 is extremely strong, a side closer to the pumping light source 4 tends to be more strongly pumped. In this case, the thermal lens effect is stronger on a side close to the pumping light source 4, while the effect is relatively weaker on a far side. There exists a distribution of the thermal lens effect. As a result, the effects of the optical rotation material 95 explained in the description directed to the operation of the above embodiment is weakened.

On the contrary, in a solid-state laser according to the embodiment as shown in FIGS. 24a and 24b, a sectional shape of the condenser 8 is an ellipse and the solid-state material 3 and pumping light source 4 are respectively located at focal lines of the ellipse. The condensing effect of the ellipse-shaped reflection surface is utilized in addition to the diffuse reflection effect, thereby allowing uniform pumping. While pumping light emitted by the pumping light source 4 is diffusely reflected off the inner surface of the condenser 8, a diffuse central component is reflected along the inner surface shape of the ellipse. By the condensing effect of the ellipse the solid-state material 3 disposed at a first focal line is uniformly pumped from the surrounding thereof.

As mentioned above, according to this embodiment, even if the power of the pumping light source 4 is extremely strong, uniform pumping can be assured. In addition to the operation of the optical rotation material 95 positioned between the plural solid-state materials 3, losses and fluctuations generated in a case where a plurality of solid-state materials are provided can be reduced, and the laser beam 14 can be extracted from the laser medium without losses, thereby allowing efficient and stable generation of a laser beam with a high quality.

Since diffuse reflection is used, the accuracy of the elliptical shape of the condenser has tolerance. Even if the elliptical condenser is not in the cross-sectional shape of a complete ellipse but nearly an ellipse, the similar effects can be obtained.

Figure 25:
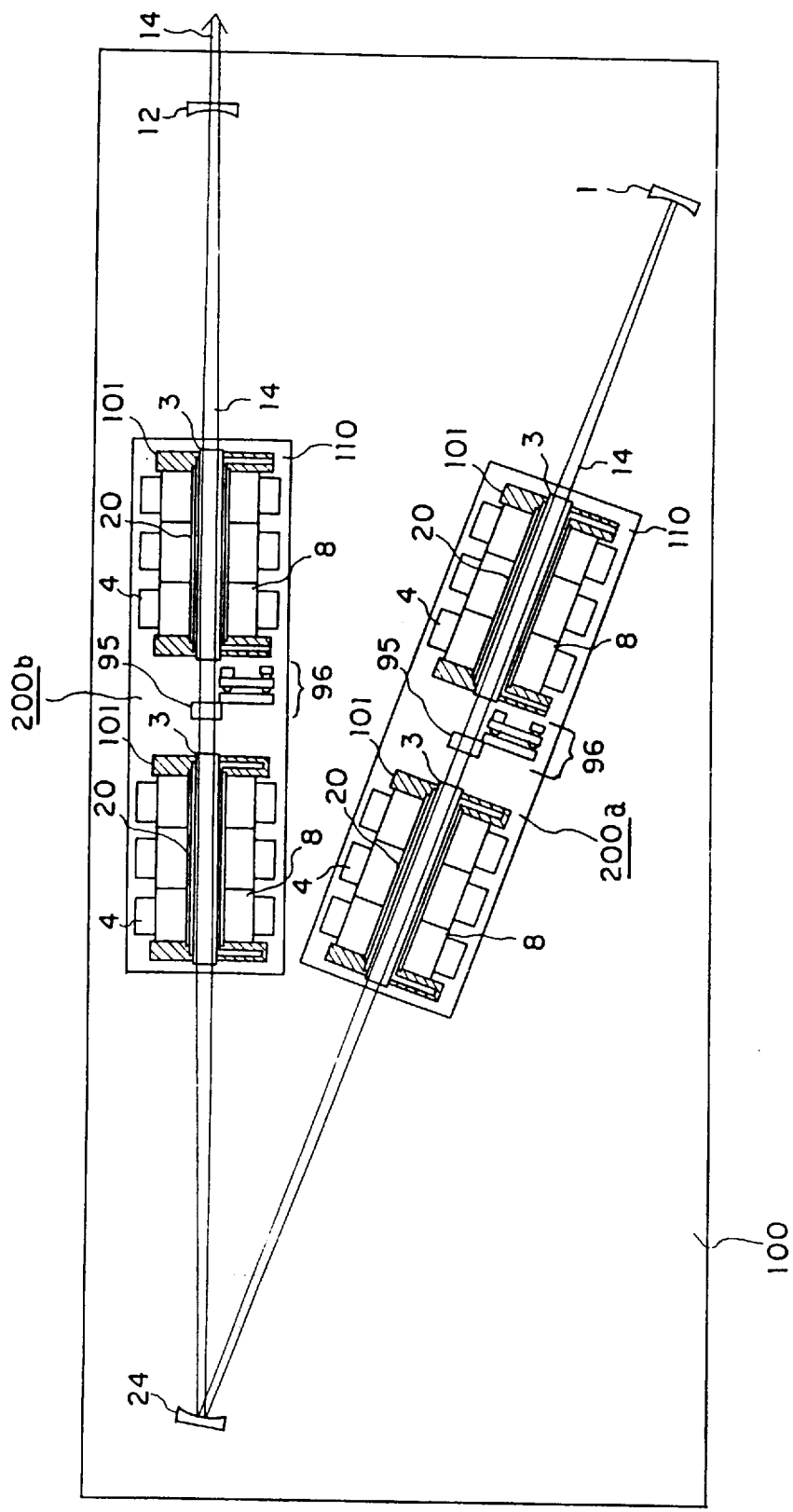
FIG. 25 is a horizontal sectional view of a solid-state laser apparatus according to another embodiment of the present invention.

FIG. 25 is a sectional view showing a solid-state laser according to another embodiment of the present invention. In the figure, the same reference numerals as those shown in FIG. 1 denote the same or corresponding components. Reference numeral 24 denotes a coupling reflection mirror. Reference numeral 110 is a module base made from, e.g., stainless steel or acrylic plate on which solid-state materials 3, pumping light sources 4, condensers 8 and an optical rotation material 95 are disposed to form an integrated pumping module. Reference numeral 200a denotes a first pumping module, while reference numeral 200b denotes a second pumping module.

The laser cavity is constructed of a partial reflection mirror 12, the coupling reflection mirror 24 and a reflection mirror 1. The optical conditions of a first optical path reciprocating between the partial reflection mirror 12 and coupling reflection mirror 24 are set to be the same as those of a second optical path reciprocating between the coupling reflection mirror 24 and reflection mirror 1. For example, such setting is realized by letting the curvature of the partial reflection mirror 12 to be the same as that of the reflection mirror 1, and letting the distance between the partial reflection mirror 12 and coupling reflection mirror 24 to be the same as that between the refection mirror 1 and coupling reflection mirror 24.

Figure 26:
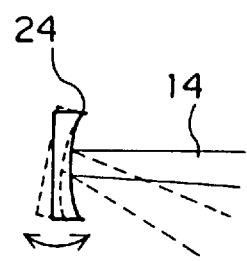
FIG. 26 is a view showing an imaginary turn of a coupling reflection mirror in the embodiment shown in FIG. 25.

Next, the description will be directed to the operation of the solid-state laser. In this embodiment, the solid-state laser with the optical systems 200a, 200b is constructed in such a manner that the optical conditions of the second pumping module 200b between the partial reflection mirror 12 and coupling reflection mirror 24 are the same as those of the first pumping module 200a between the coupling reflection mirror 24 and reflection mirror 1. Namely, if the coupling reflection mirror 24 is rotated toward the partial reflection mirror 12 as shown in FIG. 26, a laser beam 14 reciprocates in a laser cavity composed of the partial refection mirror 12 and coupling reflection mirror 24 and the laser beam 14 can be extracted from the second pumping module 200b. If the coupling reflection mirror 24 is rotated so that a laser beam 14 is transferred toward the reflection mirror 1 (assuming that the reflection mirror 1 or the coupling reflection mirror 24 is a partial reflection mirror), the laser beam 14 can be also extracted from the first pumping module 200a. Thus, since the optical conditions of a laser beam 14 passing through the first pumping module 200a are the same as those of a laser beam 14 passing through the second pumping module 200b, traces of the laser beam outside shape in the two optical paths are the same in their longitudinal directions (i.e., the outside shape of the laser beam 14 similarly varies), and there is no change in the quality and the like of the laser beam. Consequently a laser beam 14 of the almost same quality whose power is improved about twice due to connection of the two pumping modules 200a, 200b can be generated. As mentioned above, by connecting the plural pumping modules 200a, 200b, higher laser power than one obtained by single pumping module can be obtained. The laser beam 14 thus obtained is introduced to a laser working station or the like for use in, e.g., laser cutting, welding working, laser drilling, laser application and pumping another solid-state material.

Figure 27:
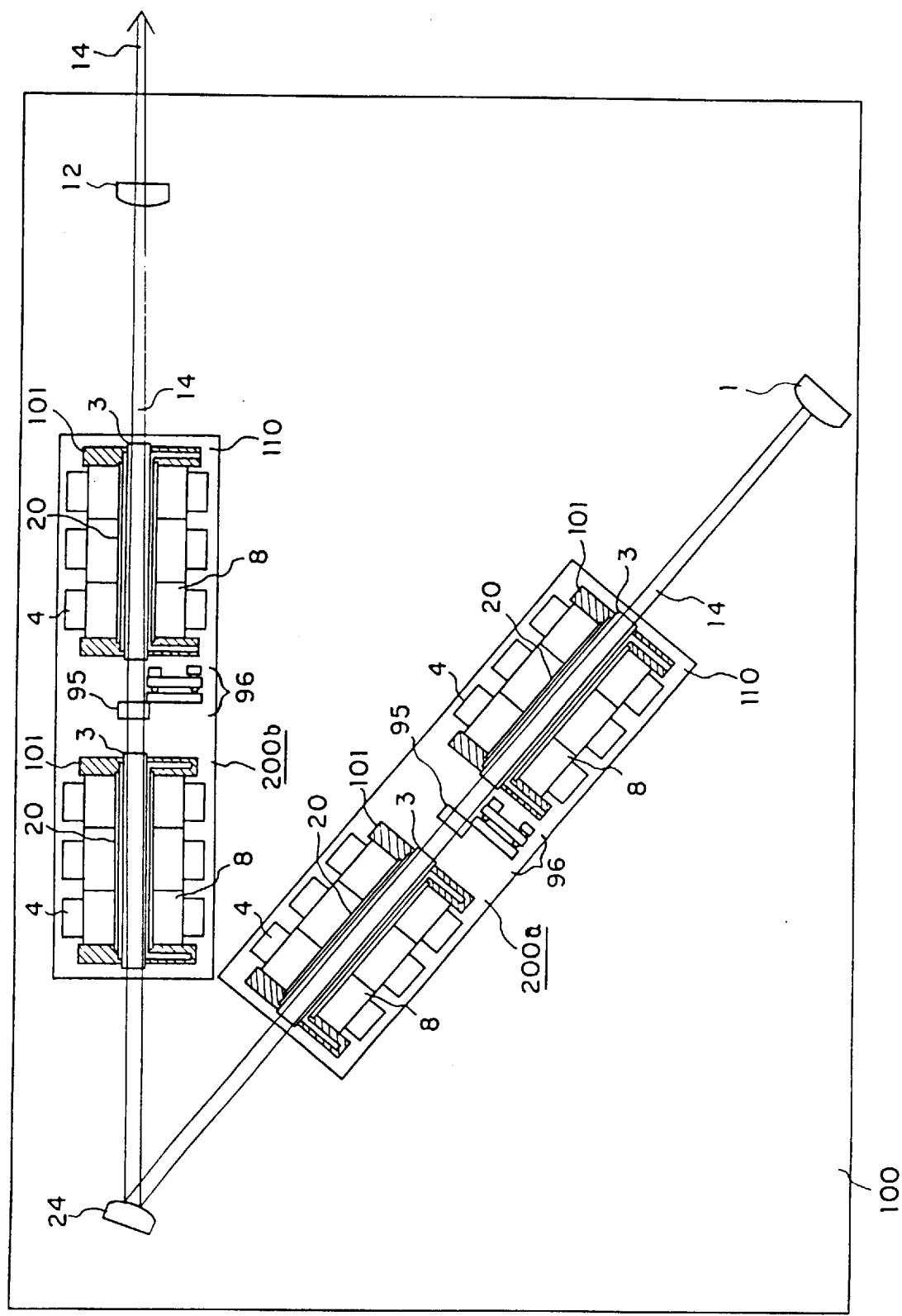
FIG. 27 is a horizontal sectional view of a solid-state laser apparatus according to a variant of the embodiment shown in FIG. 25.
Figure 28:
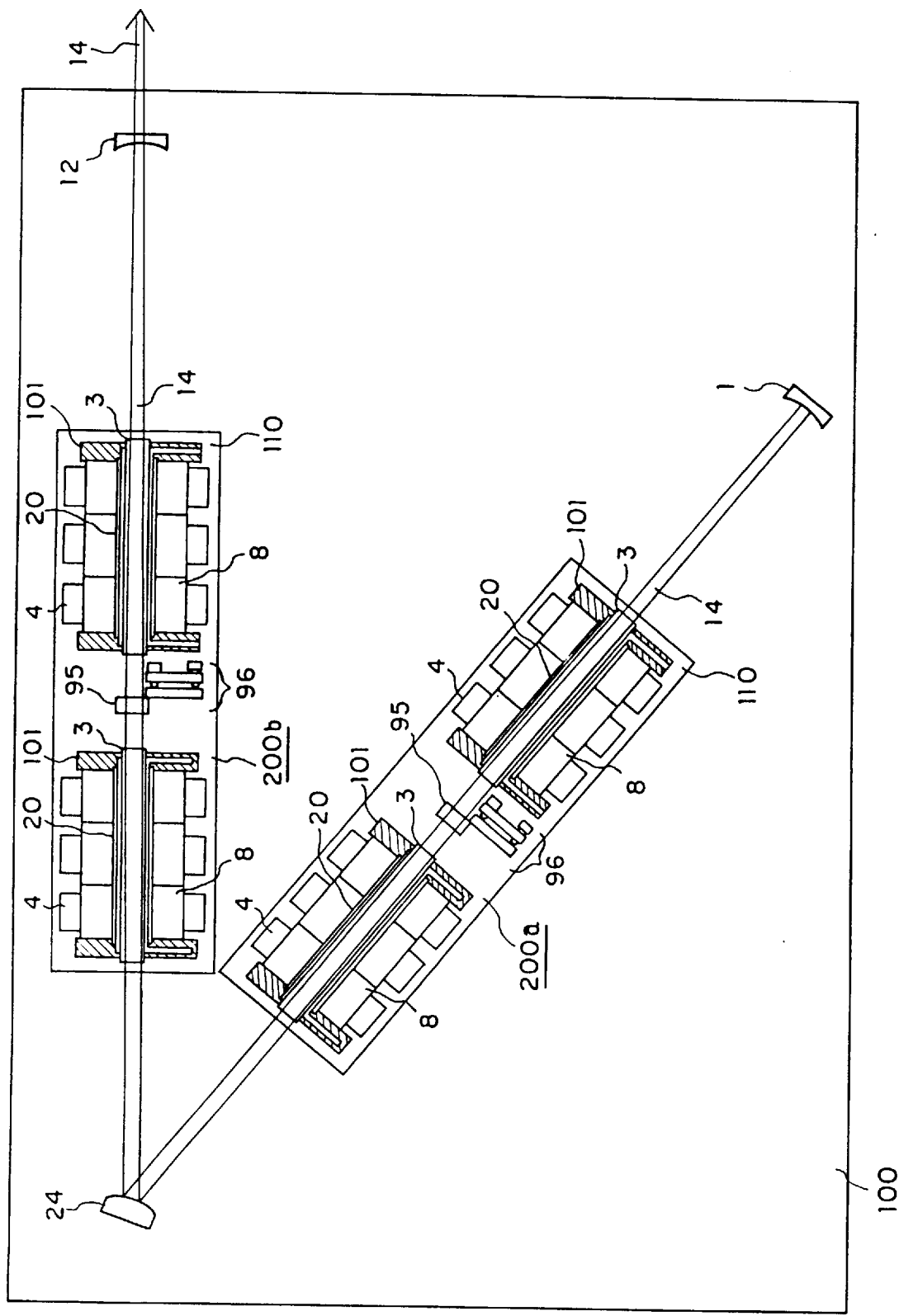
FIG. 28 is a horizontal sectional view of a solid-state laser apparatus according to a variant of the embodiment shown in FIG. 25.

This embodiment shows an example where concave mirrors are used as partial reflection mirror 12, coupling reflection mirror 24 and reflection mirror 1. However, if the concave mirrors are replaced with convex mirrors as shown in FIG. 27, the similar effects can be obtained. Furthermore, as shown in FIG. 28, the coupling reflection mirror 24 may be a convex mirror, and the partial reflection mirror 12 and the reflection mirror 1 may be concave mirrors. It is required for any structure that the outside shape of a laser beam 14 in the pumping module 200a is the same as that in the pumping module 200b. In this case, divergence of a laser beam 14 due to a convex mirror is substantially cancelled by focusing due to the thermal lens effect of a solid-state material 3, thereby keeping the laser beam 14 in a laser cavity.

Figure 29:
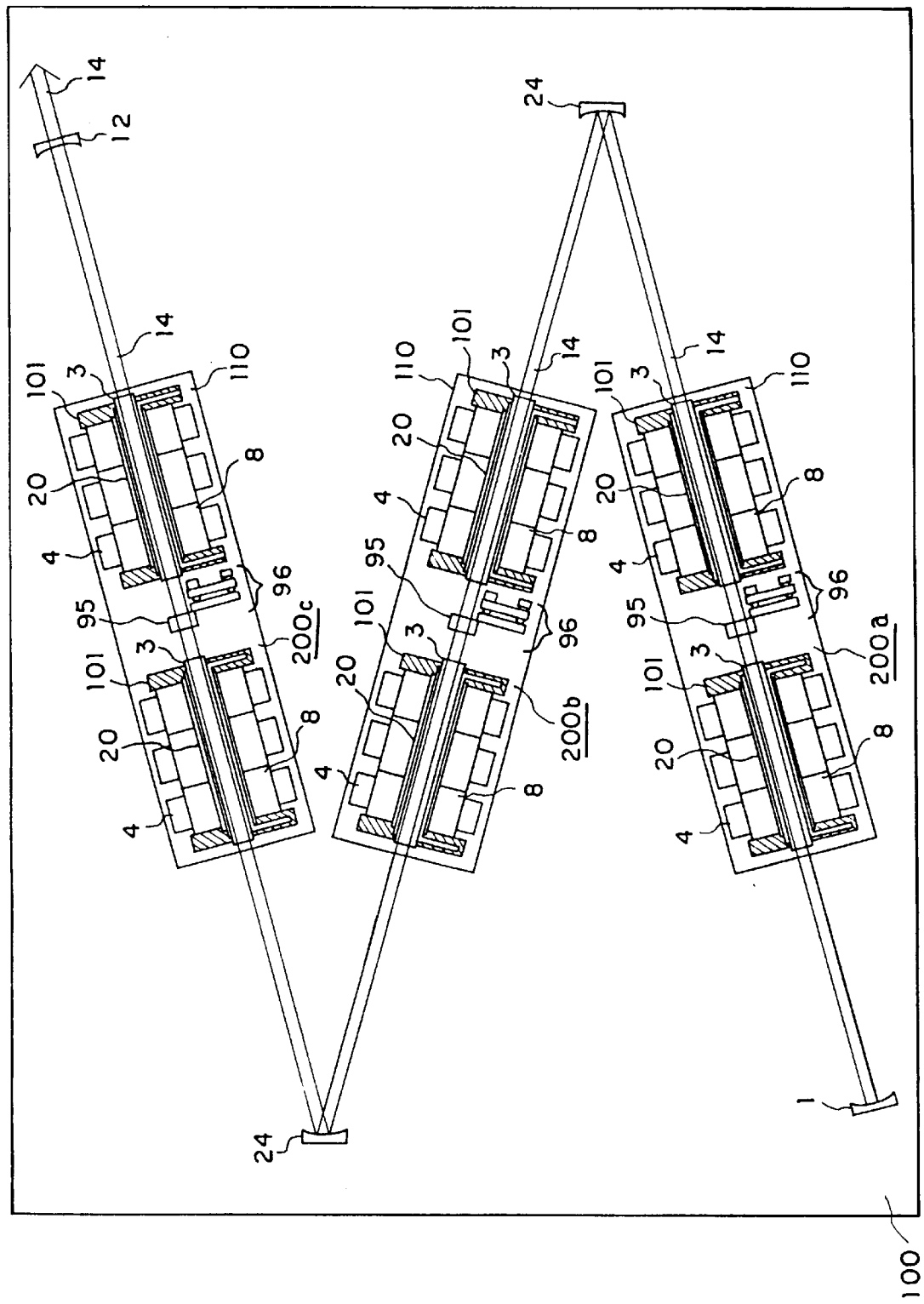
FIG. 29 is a horizontal sectional view of a solid-state laser apparatus according to a variant of the embodiment shown in FIG. 25.
Figure 30:
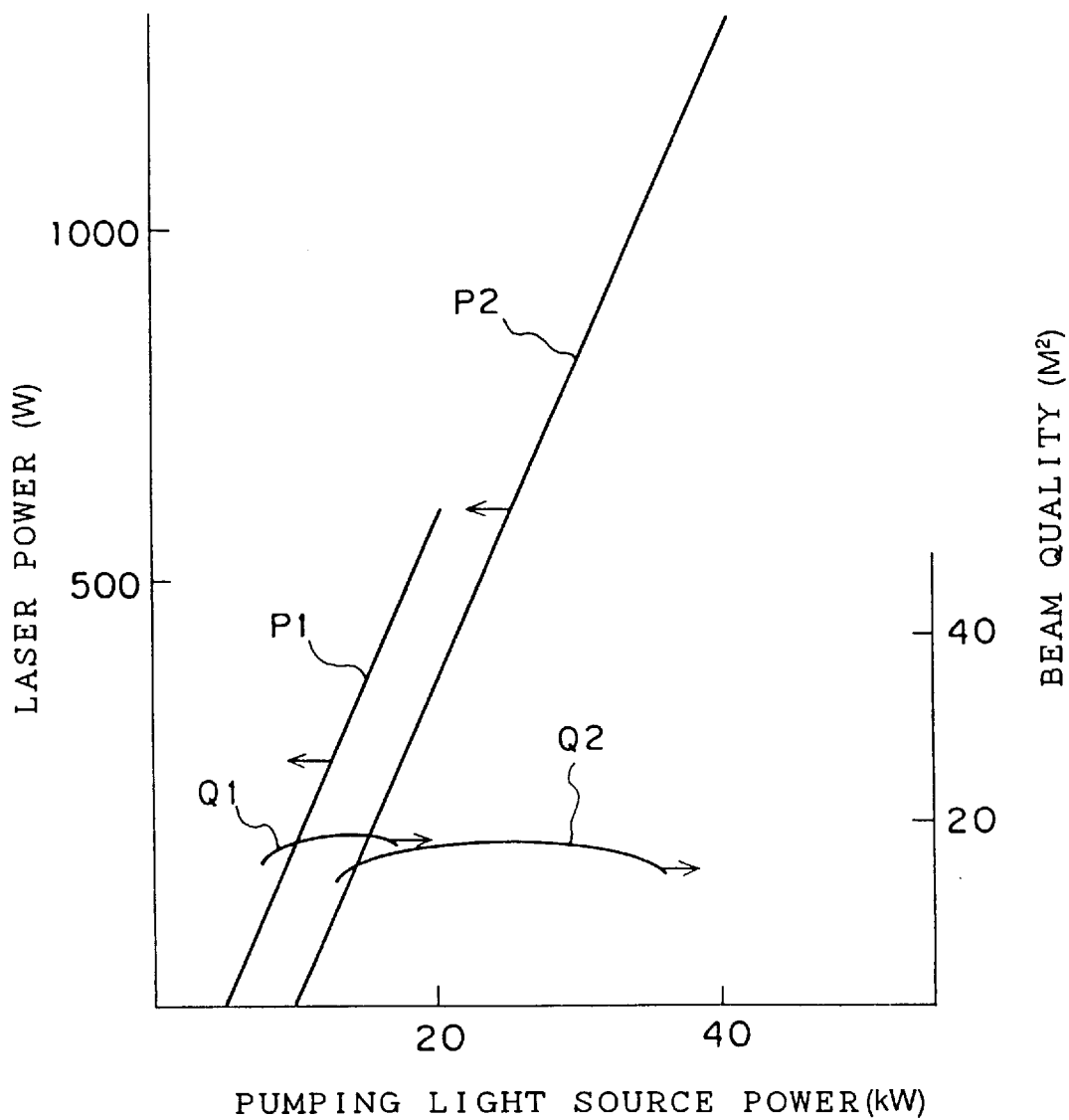
FIG. 30 is a plot showing a relationship, which is obtained by experiment, between the laser power of a laser beam and the quality of the laser beam in the solid-state laser apparatus according to the embodiment shown in FIG. 25.

This embodiment shows an example where the two pumping modules 200a, 200b are connected by means of the single coupling reflection mirror 24. However, as shown in FIG. 29, the number of pumping modules may be further increased. Three pumping modules 200a, 200b, 200c may be connected. If the number of pumping modules is increased, by letting the optical conditions of optical paths in all the pumping modules to be the same, the power of a laser can be enhanced to a desirable extent while maintaining the quality of the laser beam. FIG. 30 is a graph showing a relationship between the laser power and laser beam quality which was actually observed in an experiment. In the graph, the horizontal axis represents the power (W) of the pumping light sources 4, while the vertical axis represents the laser power (W) and the laser beam quality ($M^2$). A straight line P1 and a curved line Q1 respectively represent the oscillation characteristics and laser beam quality of one pumping module, while a straight line P2 and a curved line Q2 respectively represent the oscillation characteristics and laser beam qualities of the two pumping modules 200a, 200b in this embodiment. The laser beam quality ($M^2$) is an indicator showing what times of the divergence angle of a Gaussian laser beam 14 with the theoretical limit the divergence angle of a laser beam 14 is. The smaller the value is, the better the laser beam quality is. As apparent from FIG. 30, a increase in the number of pumping modules enhances the laser power. The laser power is enhanced in substantial proportion to the number of pumping modules.

As mentioned above, according to this embodiment, losses and fluctuations generated by the plurality of solid-state materials 3 can be reduced and the laser beam 14 can be extracted from the laser medium without losses. Thus, the laser beam 14 with a high quality and high power can be efficiently stably generated. Furthermore, since the pumping modules 200a, 200b are integrated on the same base 110, the pumping module 200a can be connected to the pumping module 200b with excellent accuracy, resulting in stable operation.

Figure 31:
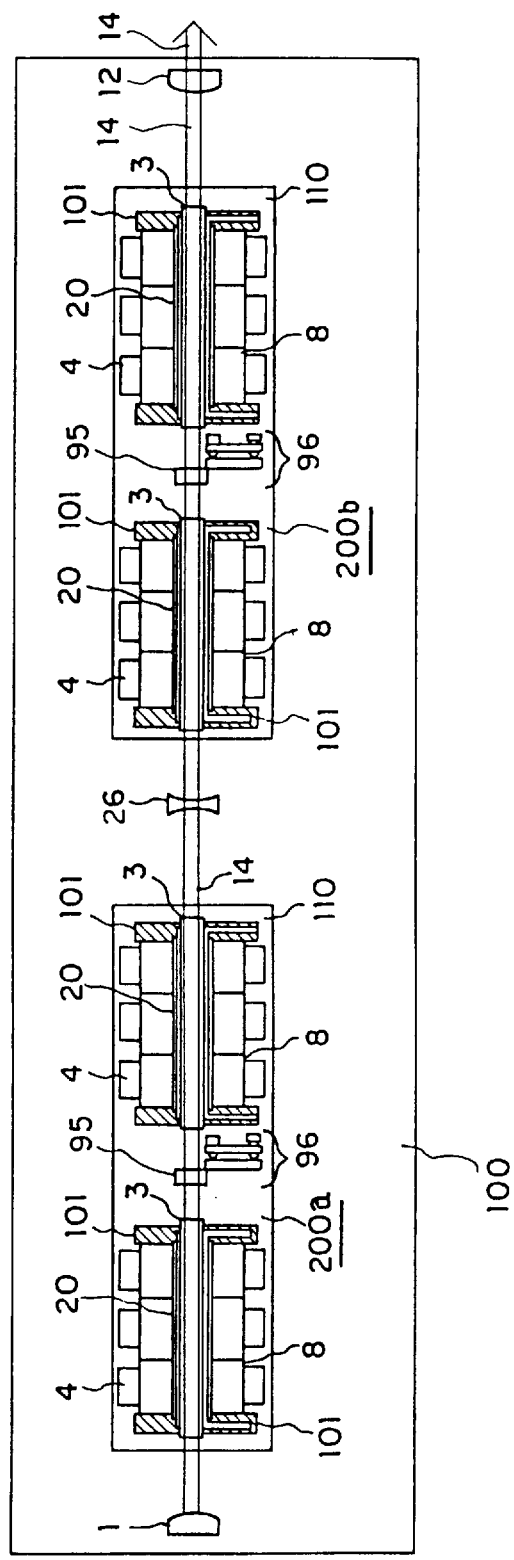
FIG. 31 is a horizontal sectional view of a solid-state laser apparatus according to another embodiment of the present invention.

FIG. 31 is a sectional view showing a solid-state laser according to another embodiment of the present invention. In the figure, the same reference numerals as those in FIG. 25 denote the same or corresponding components. Reference numeral 26 is a lens for connecting two pumping modules 200a, 200b. In this embodiment, the lens 26 serves as the coupling reflection mirror 24 in the above embodiment as shown in FIG. 25.

Next, the description will be directed to the operation. Since the lens 26 with a focal distance which is a half of the curvature of the coupling reflection mirror 24 in the embodiment as shown in FIG. 25 is located, traces of the laser beam outside shape (i.e., change in the outside shape of a laser beams) in the optical paths of the two pumping modules 200a, 200b are the same in their longitudinal directions like the above embodiment as shown in FIG. 25.

Figure 32:
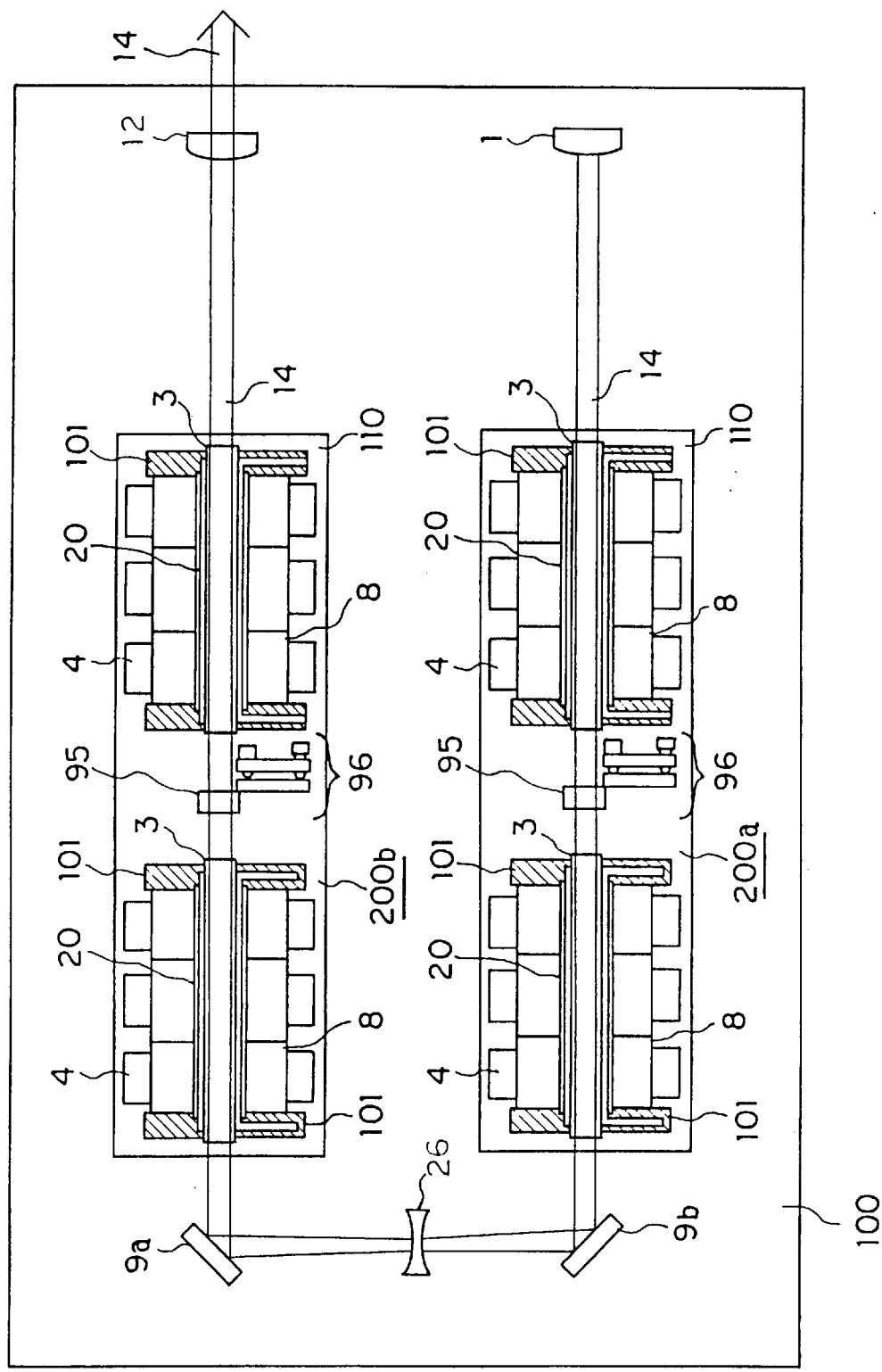
FIG. 32 is a horizontal sectional view of a solid-state laser apparatus according to a variant of the embodiment shown in FIG. 31.
Figure 33:
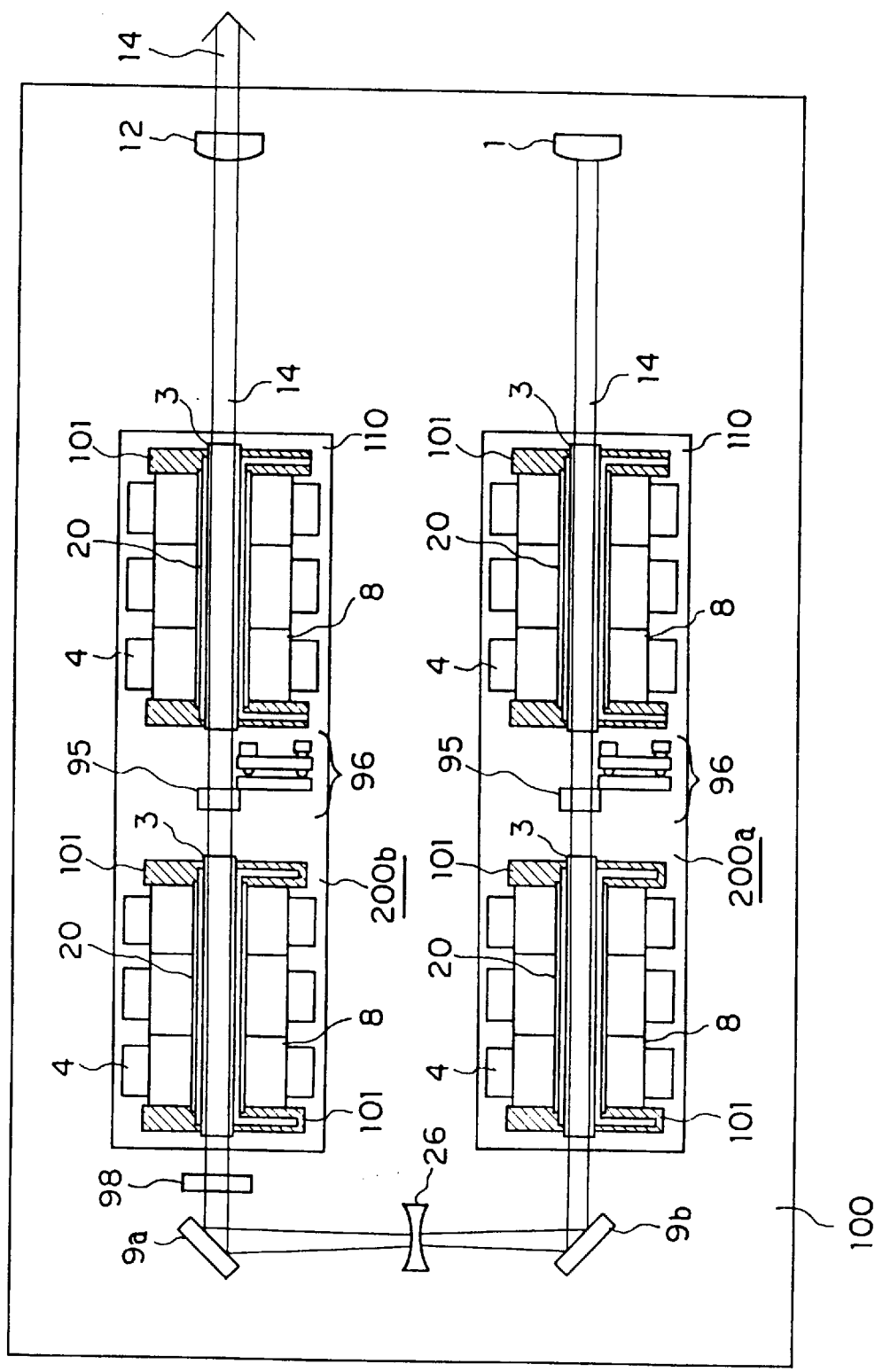
FIG. 33 is a horizontal sectional view of a solid-state laser apparatus according to a variant of the embodiment shown in FIG. 31.

Laser cavities may be placed in a straight line. Furthermore, as shown in FIG. 32, the combination with flat reflection mirrors 9a, 9b shortens the length of the apparatus. In this case, the reflectances of the flat reflection mirrors 9a, 9b for the S polarized beam is different from that for the P polarized beam. Thus, as shown in FIG. 33, a polarizer 98 may be disposed between the first pumping module 200a and the second pumping module 200b for equalizing the reflectance against the P polarized beam and S polarized beam. For example, it is assumed that a laser beam 14 whose main component is a linearly polarized beam vertical to the paper is incident. Before incidence to the laser beam flat reflection mirror 9a, this linearly polarized laser beam 14 is converted into a circularly polarized beam by the polarizer 98 which is formed of a ¼ wavelength plate and located at a slope of 45° in a plane vertical to the paper. The circularly polarized laser beam 14 is reflected on a first reflection mirror 9a, passes through a lens 26, is reflected on a second reflection mirror 9b, passes through a first pumping module 200a and then is incident to a reflection mirror 1. When the laser beam 14 is reflected on the reflection mirror 1, a rotating direction of the circularly polarized beam is reversed. The reversed circularly polarized laser beam 14 passes through the first pumping module 200a, the second reflection mirror 9b, lens 26 and first reflection mirror 9a, and then is incident to the polarizer 98 again. The polarizer 98 converts the polarization direction into the direction parallel to the paper. As mentioned above, since the polarizer 98 shown in FIG. 33 is inserted, if a linearly polarized beam vertical or parallel to the paper is generated, its linear direction is immediately converted into the vertical direction thereto every reciprocation between the pumping modules 200a, 200b. Namely, a component vertical to the paper is converted into a component parallel to the paper, and a component parallel to the paper is converted into a component vertical to the paper. As a result, the powers of the two components are equalized to prevent for a polarization direction to lean to either direction. On the contrary, in a case where there is no polarizer 98 as shown in FIG. 32, the power of a linearly polarized component of a laser beam vertical or parallel to the pater becomes larger depending on a folding direction of the flat reflection mirrors 9a, 9b.

As mentioned above, according to this embodiment, like the above embodiment as shown in FIG. 25, losses and fluctuations generated by the plurality of solid-state materials 3 can be reduced and the laser beam 14 can be extracted from the laser medium without losses. Thus, the laser beam 14 with a high quality and high power can be efficiently stably generated. Furthermore, since the pumping modules 200a, 200b are integrated on the same base 110, the pumping module 200a can be stably connected to the pumping module 200b.

Figure 34:
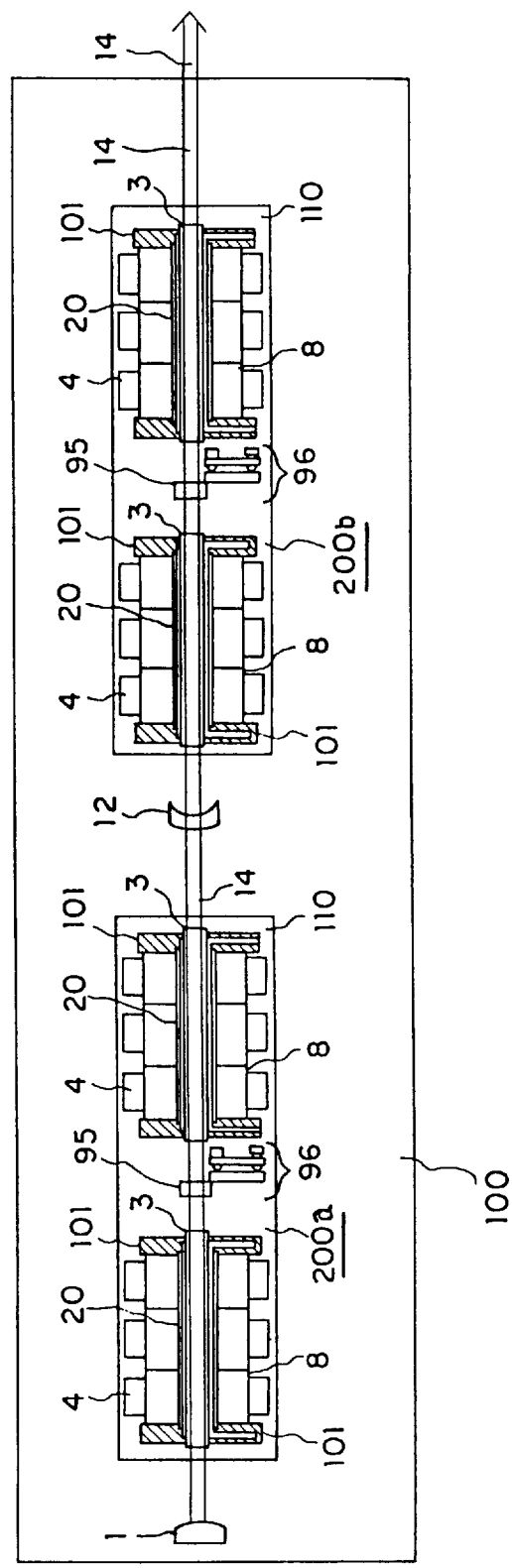
FIG. 34 is a horizontal sectional view of a solid-state laser apparatus according to another embodiment of the present invention.

FIG. 34 is a sectional view showing a solid-state laser according to another embodiment of the present invention. In the figure, the same reference numerals as those in FIG. 25 denote the same or corresponding components. Like the above embodiments as shown in FIGS. 25 and 31, solid-state materials 3, pumping light sources 4, condensers 8 and optical rotation materials 95 are disposed on one module base 110 to form an integrated pumping module. The solid-state laser of this embodiment has a laser oscillator-laser amplifier structure. A first pumping module 200a is a laser oscillator with a laser cavity formed of a partial reflection mirror 12 and a reflection mirror 1. The laser is constructed in such a manner that a laser beam 14 emitted from the first pumping module 200a passes through a second pumping module 200b one time. The laser beam 14 is amplified by the pumping module 200b.

Next, the description will be directed to the operation of the solid-state laser. The laser beam 14 is generated from the first pumping module 200a which is a laser oscillator located on the left side of the paper by the laser cavity constructed of the partial reflection mirror 12 and reflection mirror 1. The curvature of the outer surface of the partial reflection mirror 12 is constructed so as to give a certain lens effect to the laser beam 14 generated by partial reflection of this mirror. Here, like the above embodiment as shown in FIG. 25, the optical conditions of a first optical path reciprocating between the partial reflection mirror 12 and reflection mirror 1 are set to be the same as those of a laser beam 14 passing through a second pumping module 200b (trace of a laser beam outside shape in the optical axial direction). Thus, a laser beam 14 discharged from the partial reflection mirror 12 of a laser beam generated at the first pumping module 200a passes through the second pumping module 200b with the same outside shape trace and at the same time is amplified by the second pumping module 200b which serves as a laser amplifier.

The above-mentioned laser oscillator-laser amplifier structure is effective in extracting large laser power and suitable for obtaining pulse laser power. In the above embodiment as shown in FIG. 31, all the pumping modules 200a, 200b are disposed in the laser cavity and the use of the plural pumping modules leads to high power. In this case, laser power inside the laser cavity is larger than laser power extracted outwardly. Since all this large laser power reciprocates between all the pumping modules 200a, 200b, the pumping modules 200a, 200b or interior optical components may be thermally deformed. In this embodiment, a laser beam 14 reciprocating in the laser cavity is generated only in the first pumping module 200a and thereafter passes through the second pumping module 200b acting as an amplifying medium one time. Since the plural pumping modules 200a, 200b are constructed in such a manner, a degree of thermal deformations of the pumping modules 200a, 200b or interior optical components can be reduced.

Figure 35:
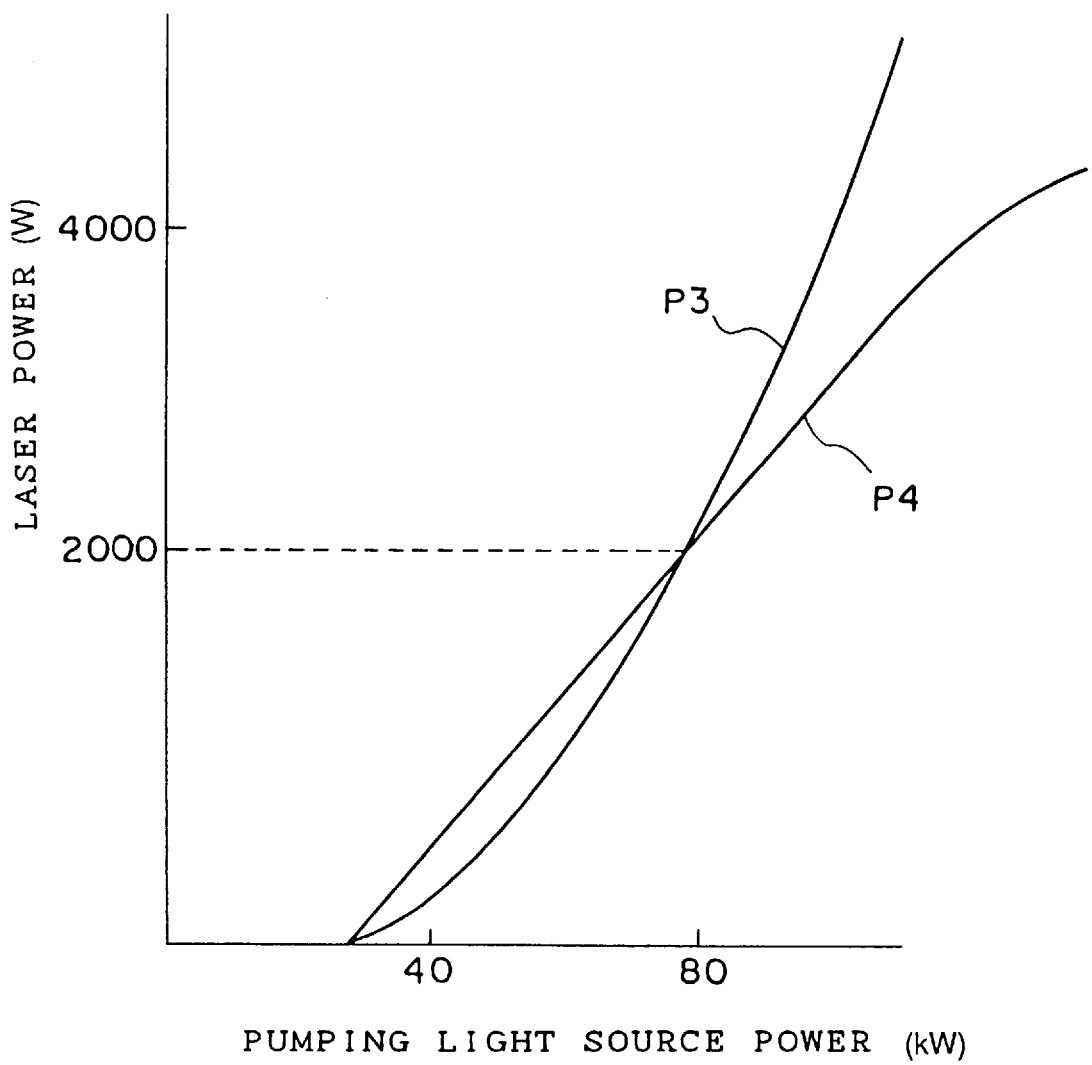
FIG. 35 is a graph showing a laser oscillating characteristic in an oscillator-amplifier configuration according to the embodiment shown in FIG. 34 as compared with a laser oscillating characteristic in a single-oscillator configuration.

If the strength of the laser beam 14 passing through the laser medium increases, the amplifying ratio of the laser medium tends to be saturated. For example, when input laser power is considerably small, incident laser power whose amplifying ratio is attenuated to a half is called a saturated strength. If laser power with a strength close to the saturated strength is incident, efficient laser power can be obtained only by amplification without use of a laser cavity. The value of this saturated strength of, e.g., a Nd:YAG laser is about 1500 W for a 8 mm diameter rod. Thus, when large power laser of about 1500 W is constructed, laser power can be efficiently generated by using the laser oscillator-laser amplifier structure. FIG. 35 is a graph showing the laser oscillation characteristics in the laser oscillator-laser amplifier structure according to this embodiment and the laser oscillation characteristics in single laser oscillator structure. In the graph, P3 represents the laser oscillation characteristics in the laser oscillator-laser amplifier structure according to this embodiment, while P4 represents the laser oscillation characteristics in a laser oscillator structure. As apparent from the graph, if laser power exceeds 200 W, the laser oscillator-laser amplifier structure according to this embodiment is more advantageous.

Although the laser oscillator is constructed of the single pumping module 200a in this embodiment, it may be constructed of connected plural pumping modules. As far as a similar laser beam outside shape trace (change in a laser beam outside shape) is formed in each pumping module in the optical axial direction, laser power can be enhanced to a desirable extent while maintaining the quality of the laser beam 14.

Figure 36:
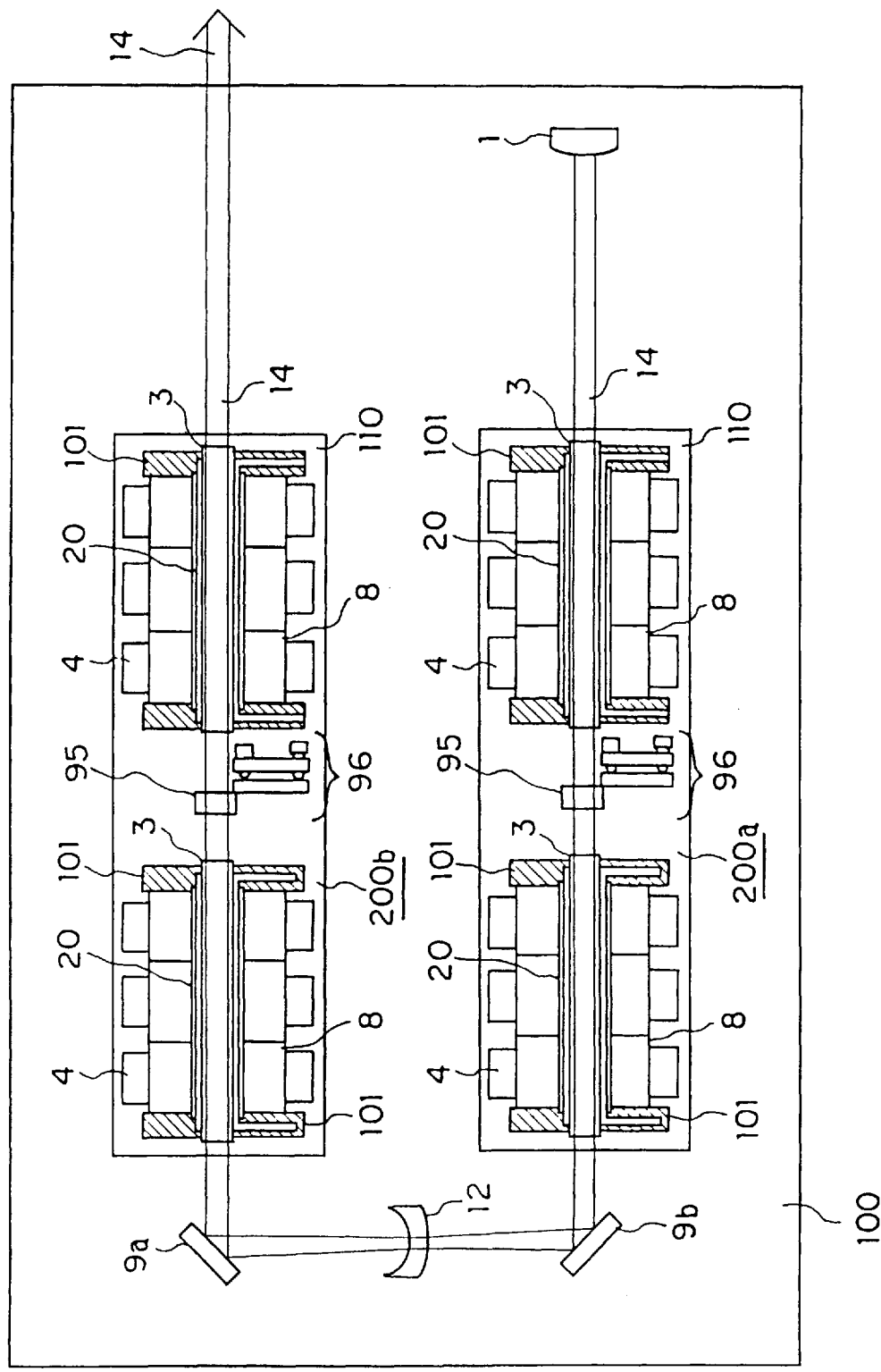
FIG. 36 is a horizontal sectional view of a solid-state laser apparatus according to a variant of the embodiment shown in FIG. 34.

Furthermore, as shown in FIG. 36, the flat reflection mirrors 9a, 9b are combined to shorten the length of the apparatus.

As stated above, according to this embodiment, like the embodiment as shown in FIG. 25, losses and fluctuations generated by the plurality of solid-state materials 3 can be reduced and the laser beam 14 can be extracted from the laser medium without losses. As compared with the embodiments as shown in FIGS. 25 and 31, the laser beam 14 with the higher quality and higher power can be efficiently stably generated. Furthermore, since the pumping modules 200a, 200b are integrated on the same base 110, the pumping module 200a can be stably connected to the pumping module 200b. In addition, a degree of thermal deformations of the pumping modules 200a, 200b or interior optical components can be reduced.

In each of the above embodiments, it is premised that cross sections of the solid-state materials 3 and flow tubes 20 are circular. However, they are not limited to a circle. They may be a rectangles or ellipse.

Furthermore, although there was no particular explanation in each of the above embodiments, a nonreflective thin film may be coated on some of parts such as side walls of the flow tubes 20 and optical materials through which the laser beam 14 passes which were not particularly mentioned like normal optical materials. As a result, the passing loss is reduced, permitting efficient laser oscillation.

Furthermore, although Nd:YAG (Nd:Yttrium Aluminum Garnet) is used as a solid-state material 3, there is no limitation thereto. For example, Nd:YLF (Nd:Lithium Yttrium Fluoride) can be used. Any material which can be a laser medium by light pumping can be used. Such a material is not limited to a solid.

Figure 37:
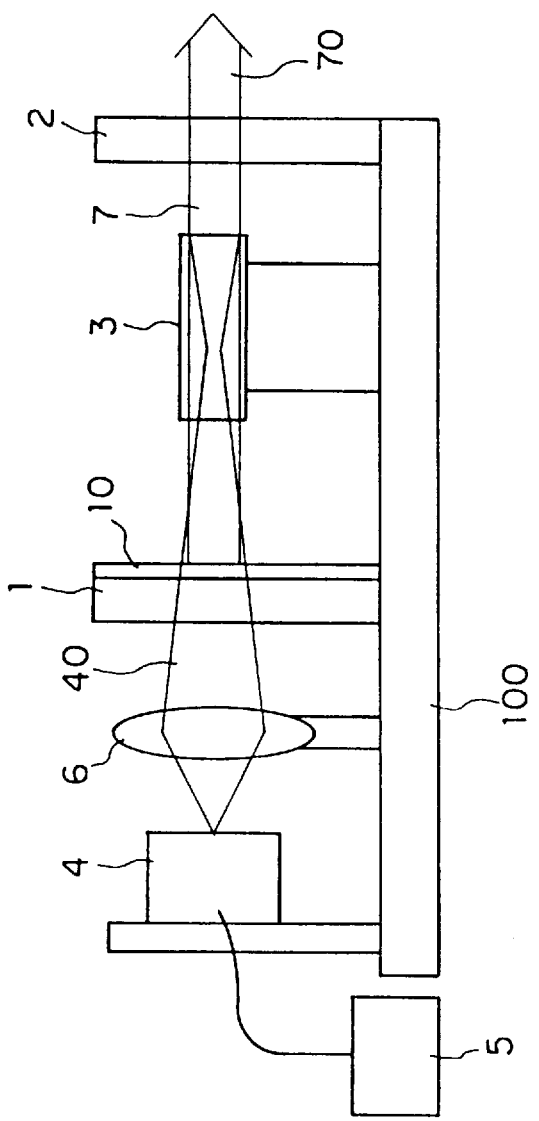
FIG. 37 is a view showing a prior art solid-state laser apparatus.

Furthermore, although a semiconductor laser is used as a pumping light source 4, there is no limitation thereto. For example, as shown in FIG. 37, an arc lamp or a flash lamp may be used as a light source for light pumping.

Furthermore, although solid-state materials 3 with the same size are pumped under the same conditions, there is no limitation thereto. In some cases, solid-state materials 3 which are different in length or characteristics are preferably used so that the two regions overlap as shown in FIG. 6(b). Furthermore, in some cases, the power of a light pumping source 4 is preferably varied by plural solid-state materials 3.

Many widely different embodiments of the present invention may be made without departing from the spirit and scope thereof. It is to be understood that the present invention is not limited to the specific embodiments thereof except as defined in the appended claims.

What is claimed is:

1. A solid-state laser apparatus comprising:
    a plurality of solid-state materials disposed along an optical axis of light incident thereon and separated from one another, the plural solid-state materials each having an active solid-state medium;
    pumping means for pumping the plural solid-state materials, thereby causing the plurality of solid-state materials to emit a laser beam, wherein said pumping means comprises a plurality of condensers each having a diffusive reflection surface for focusing light on one of the solid-state materials which is surrounded by the diffusive reflection surface;
    polarization rotating means disposed between first and second ones of the plural solid-state materials for rotating a direction of polarization of the laser beam incident thereon;
    beam displacement means for displacing an optical axis of the laser beam exiting the first one of the plurality of solid-state materials to be aligned with an optical axis of the second one of the plurality of solid-state materials, thereby improving at least one of a beam quality and power of the laser beam; and
    laser optical means for outputting the laser beam emitted by the plural solid-state materials,.

2. The solid-state laser apparatus according to claim 1, wherein said polarization rotating means includes at least one optical rotation material for rotating the direction of polarization of the incident laser beam through an angle of about 90°.

3. The solid-state laser apparatus according to claim 1, wherein said beam displacement means comprises an angle adjusting means for adjusting an angle which said polarization rotating means forms with the optical axis of the incident laser beam, thereby displacing the optical axis of the laser beam.

4. The solid-state laser apparatus according to claim 1, wherein said beam displacement means comprises an optical axis correcting means disposed between two of said plural solid-state materials for correcting the position of the optical axis of a laser beam incident thereon.

5. The solid-state laser apparatus according claim 4, wherein said optical axis correcting means is a wedge member.

6. The solid-state laser apparatus according to claim 1, wherein said laser apparatus further comprises a moving means for moving an end part of at least one of said plurality of solid-state materials vertically and horizontally.

7. The solid-state laser apparatus according to claim 1, wherein said laser optical means includes a laser cavity which outputs the laser beam at a transverse mode, and wherein the laser beam output from said laser optical means has a quality equal to or less than $1/100$ of a Gaussian laser beam, the quality of the laser beam being being proportional to the ratio of $\phi/2\omega$, where $\phi$ is the diameter of the plurality of solid-state materials and $\omega$ is the largest value of the radius of the laser beam within the plurality of solid-state materials and is based on a length of the laser cavity and a curvature of the mirror of the laser cavity.

8. The solid-state laser apparatus according to claim 1, wherein said laser apparatus further comprises a wavelength converting means for converting the wavelength of the laser beam emitted by the plural solid-state materials.

9. The solid-state laser apparatus according claim 8, wherein said laser apparatus further comprises a temperature controlling means for controlling the temperature of said wavelength converting means so that a distribution of thermal deformations in cross section of said wavelength converting means is geometrically similar to a distribution of thermal deformations in cross section of any one of said solid-state materials.

10. The solid-state laser apparatus according to claim 1, wherein the diffusive reflection surface of said condenser is in the cross-sectional shape of an ellipse and each of the active solid-state media of said plural solid-state materials are respectively mounted on first focal lines of said elliptical condensers, and wherein said pumping means includes a plurality of pumping light sources which are respectively mounted on second focal lines of said elliptical condensers.

11. The solid-state laser apparatus according to claim 1, wherein said laser apparatus further comprises a base on which at least said plural solid-state materials, said pumping means, and said polarization rotating means are arranged integrally.

12. A solid-state laser apparatus comprising:

a plurality of pumping modules each including a plurality of solid-state materials disposed along an optical axis of light incident thereon and separated from one another, the plural solid-state materials each having an active solid-state medium, pumping means for pumping the plural solid-state materials thereby causing the plurality of solid-state materials to emit a laser beam, and means disposed between two of the plural solid-state materials for rotating a direction of polarization of the laser beam incident thereon, wherein at least one of the pumping means includes a condenser having a diffusive reflection surface;

an optical coupling means for optically coupling said plural pumping modules so that a trace of the outside shape of the laser beam within said one pumping module is substantially the same as a trace of the outside shape of the laser beam within any other pumping module, thereby improving at least one of a beam quality and power of the laser beam; and a laser optical means for outputting the laser beam emitted by the plural pumping modules.

13. The solid-state laser apparatus according to claim 12, wherein said polarization rotating means includes at least one optical rotation material for rotating the direction of polarization of the laser beam through a total angle of about 90° when the laser beam passes therethrough one time.

14. The solid-state laser apparatus according to claim 12, wherein any one of said plural pumping modules serves as a laser oscillator and the other pumping modules serve as laser amplifiers.

15. The solid-state laser apparatus according to claim 12, wherein each of said plural pumping modules comprises a base on which the pumping module is integrally disposed.

16. A solid-state laser apparatus comprising:

a plurality of solid-state materials disposed along an optical axis of light incident thereon and separated from one another, the plural solid-state materials each having an active solid-state medium;

pumping means for pumping the plural solid-state materials, thereby causing the plurality of solid-state materials to emit a laser beam;

optical axis correcting means disposed between first and second ones of the plurality of solid-state materials for displacing the position of the optical axis of the laser beam exiting the first solid-state material to be aligned with an optical axis of the second solid-state material, thereby improving at least one of a beam quality and power of the laser beam; and laser optical means for outputting the laser beam emitted by the plural solid-state materials.

17. The solid-state laser apparatus according to claim 16, wherein said optical axis correcting means is a wedge member.

18. A solid-state laser apparatus comprising:

a plurality of solid-state materials disposed along an optical axis of light incident thereon and separated from one another, the plural solid-state materials each having an active solid-state medium;

pumping means for pumping the plural solid-state materials, thereby causing the plurality of solid-state materials to emit a laser beam;

moving means for moving an end part of a first one of said plurality of solid-state materials vertically and horizontally to align the laser beam exiting a second one of said plurality of solid-state materials with the first solid-state material, thereby improving at least one of a beam quality and power of the laser beam; and laser optical means for outputting the laser beam emitted by the plural solid-state materials.

19. A solid-state laser apparatus comprising:

a plurality of solid-state materials disposed along an optical axis of light incident thereon separated from one another, the plural solid-state materials each having an active solid-state medium;

pumping means for pumping the plural solid-state materials;

wavelength converting means for converting the wavelength of the laser beam emitted by the plural solid-state materials;

temperature controlling means for controlling the temperature of said wavelength converting means so that a distribution of thermal deformations in cross section of said wavelength converting means is geometrically similar to a distribution of thermal deformations in cross section of any one of said plurality of solid-state materials, thereby improving stability of the wavelength converted laser beam; and laser optical means for extracting the laser beam emitted by said plural solid-state materials.

* * * * *